(12) United States Patent
Park et al.

(10) Patent No.: US 12,520,061 B2
(45) Date of Patent: Jan. 6, 2026

(54) IMAGE SENSING DEVICE USING ADAPTIVELY ADJUSTED PRE-CHARGE CURRENT

(71) Applicant: SK hynix Inc., Gyeonggi-do (KR)

(72) Inventors: Yu Jin Park, Gyeonggi-do (KR); Nam Ryeol Kim, Gyeonggi-do (KR); Kang Bong Seo, Gyeonggi-do (KR); Jeong Eun Song, Gyeonggi-do (KR); Jung Soon Shin, Gyeonggi-do (KR); Seung Hwan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/391,691

(22) Filed: Dec. 21, 2023

(65) Prior Publication Data
US 2024/0129648 A1  Apr. 18, 2024

Related U.S. Application Data

(63) Continuation of application No. 17/468,295, filed on Sep. 7, 2021, now Pat. No. 11,895,418.

(30) Foreign Application Priority Data

Mar. 4, 2021 (KR) .................... 10-2021-0028903

(51) Int. Cl.
*H04N 25/75* (2023.01)
*H04N 25/62* (2023.01)
(Continued)

(52) U.S. Cl.
CPC ............. *H04N 25/75* (2023.01); *H04N 25/62* (2023.01); *H04N 25/709* (2023.01); *H04N 25/771* (2023.01); *H04N 25/772* (2023.01)

(58) Field of Classification Search
CPC ........ H04N 25/75; H04N 25/77; H04N 25/62; H04N 25/709; H04N 25/772; H04N 25/771; H04N 25/778
See application file for complete search history.

(56) References Cited

U.S. PATENT DOCUMENTS

| 2010/0072350 A1 | 3/2010 | De Wit et al. |
| 2021/0218926 A1* | 7/2021 | Sato ........................ H04N 25/77 |
| 2021/0274118 A1* | 9/2021 | Decaens ................ H04N 25/75 |

FOREIGN PATENT DOCUMENTS

| CN | 106356026 A | 1/2017 |
| CN | 109712566 A | 5/2019 |

(Continued)

OTHER PUBLICATIONS

Office Action for Chinese Patent Application No. 202210188490.7 issued by the Chinese Patent Office on Aug. 12, 2024.

(Continued)

*Primary Examiner* — Nicholas G Giles
(74) *Attorney, Agent, or Firm* — IP & T GROUP LLP

(57) ABSTRACT

An image sensing device includes: a control circuit coupled between an output terminal of a pixel signal and a high voltage terminal, and configured to generate a control voltage corresponding to a voltage level of the pixel signal; and a current supplying circuit coupled between the output terminal and the high voltage terminal, and configured to supply a pre-charge current, which is configured to be adaptively adjusted according to the voltage level of the pixel signal, to the output terminal based on the control voltage.

9 Claims, 18 Drawing Sheets

(51) Int. Cl.
*H04N 25/709* (2023.01)
*H04N 25/771* (2023.01)
*H04N 25/772* (2023.01)

(56) References Cited

FOREIGN PATENT DOCUMENTS

| | | |
|---|---|---|
| CN | 111147774 A | 5/2020 |
| WO | 2020/040065 A1 | 2/2020 |

OTHER PUBLICATIONS

Office Action for Korean Patent Application No. 10-2021-0028903 issued by the Korean Patent Office on Nov. 26, 2025.

\* cited by examiner

IMAGE SENSING DEVICE USING ADAPTIVELY ADJUSTED PRE-CHARGE CURRENT

CROSS-REFERENCE TO RELATED APPLICATION(S)

This application is a continuation of U.S. patent application Ser. No. 17/468,295 filed on Sep. 7, 2021, which claims priority under 35 U.S.C. § 119 to Korean Patent Application No. 10-2021-0028903, filed on Mar. 4, 2021, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices are devices for capturing images using the property of a semiconductor which reacts to light. Image sensing devices are generally classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

The paper "A 0.50 erms Noise 1.45 µm-Pitch CMOS Image Sensor with Reference-Shared In-Pixel Differential Amplifier at 8.3 Mpixel 35 fps" discloses a reference-shared in-pixel differential common source amplifier (RSDA) (hereinafter referred to as "in-pixel amplifier"). The in-pixel amplifier can achieve a high conversion gain when a pixel signal is read out, but there is a concern that the readout speed deteriorates with this design.

SUMMARY

Various embodiments of the present disclosure are directed to an image sensing device capable of reducing a load of a readout line of a pixel signal in a structure where an in-pixel amplifier is coupled to the readout line.

Also, various embodiments of the present disclosure are directed to an image sensing device capable of minimizing the settling time of a pixel signal outputted through a readout line of the pixel signal in a structure where an in-pixel amplifier is coupled to the readout line, and an operating method of the image sensing device.

In accordance with an embodiment, an image sensing device may include: a control circuit coupled between an output terminal of a pixel signal and a high voltage terminal, and configured to generate a control voltage corresponding to a voltage level of the pixel signal; and a current supplying circuit coupled between the output terminal and the high voltage terminal, and configured to supply a pre-charge current, which is configured to be adaptively adjusted according to the voltage level of the pixel signal, to the output terminal based on the control voltage.

In accordance with an embodiment, an image sensing device may include: a reference circuit coupled between a high voltage terminal and a control node, and configured to supply a reference voltage to the control node based on a reference control signal; a sensing circuit coupled between the control node and an output terminal of a pixel signal, and configured to sense a slope of the pixel signal based on the reference control signal and a boost control signal, wherein the sensing circuit is configured to supply a control voltage to the control node according to the slope sensed; a subtraction circuit coupled between the high voltage terminal and a low voltage terminal, and configured to generate a subtraction current corresponding to the reference voltage; and a current supplying circuit coupled between the output terminal and the high voltage terminal, and configured to supply a pre-charge current, to which the subtraction current is applied, to the output terminal based on the control voltage and the subtraction current.

In accordance with an embodiment, an image sensing device may include: a reference pixel; a reference pixel; a target pixel; an amplifier coupled in common to the reference pixel and the target pixel, and configured to output a pixel signal of the target pixel through an output terminal during a readout period of a target row time; and a pre-charger configured to supply a pre-charge current, which is configured to be adaptively adjusted according to a voltage level of the pixel signal, to the output terminal during an initial time of the readout period.

In accordance with an embodiment, an image sensing device may include: a reference pixel; a target pixel including a floating diffusion node, and a reset transistor element configured to reset a potential of the floating diffusion node during a reset period of a target row time; an amplifier coupled in common to the reference pixel and the target pixel, and configured to output a target pixel signal of the target pixel through an output terminal during a readout period of the target row time; and a switching circuit configured to decouple the reset transistor element from the output terminal during at least the readout period.

The switching circuit may be configured to couple the reset transistor element to the output terminal during at least the reset period.

The switching circuit may include a first switch and a second switch coupled in series between the output terminal and the reset transistor element, the first switch may be configured to be opened during at least the readout period of the target row time based on a line decoupling signal, and the second switch may be configured to be shorted during the target row time based on a row change signal.

The reference pixel may include a pixel disposed in a row adjacent to a row where the target pixel is disposed.

In accordance with an embodiment, an image sensing device may include: a plurality of pixels each including a floating diffusion node and a reset transistor element configured to reset a potential of the floating diffusion node; an amplifier configured to sequentially output a plurality of pixel signals of the plurality of pixels through an output terminal; and a switching circuit configured to couple a first pixel of the plurality of pixels to the amplifier as a reference pixel and coupling a second pixel of the plurality of pixels to the amplifier as a target pixel, for each target row time, wherein the switching circuit includes a first switch configured to decouple the output terminal from the reset transistor element, included in the target pixel, during other row times except for an initial row time of the target row time.

The first switch may be configured to couple the reset transistor element to the output terminal during the initial row time.

The reset transistor element may be configured to reset a potential of the floating diffusion node during a reset period of the target row time, and the initial row time includes the reset period.

The target pixel may be configured to generate a target pixel signal during a readout period of the target row time, and the other row times include the readout period.

The switching circuit may further include a second switch coupled in series to the first switch between the output terminal and the reset transistor element, the first switch may be configured to be opened during the other row times of the target row time based on a line decoupling signal, and the second switch may be configured to be shorted during the target row time based on a row change signal.

The first pixel may be disposed in a first row adjacent to a second row where the second pixel is disposed.

In accordance with an embodiment, an image sensing device may include: a reference pixel; a target pixel electrically decoupled from an output terminal of a target pixel signal during a transmission time in which charges accumulated in a photodiode are transmitted to a floating diffusion node, and configured to output the target pixel signal through the output terminal during a readout period after the transmission time; an amplifier coupled to the reference pixel and the target pixel, and configured to amplify the target pixel signal during the readout period; and a disable circuit configured to disable the amplifier during the transmission time.

The disable circuit may be coupled between a high voltage terminal and the amplifier, and may be configured to electrically decouple the high voltage terminal from the amplifier during the transmission time.

The image sensing device may further include a compensation circuit configured to supply a compensation current to a common node to which a current source included in the amplifier is coupled, during the transmission time.

The compensation circuit may include: a first switch coupled between a high voltage terminal and a coupling node, and configured to operate based on a first control signal having a fixed voltage level; and a second switch coupled between the coupling node and the common node, and configured to operate based on a second control signal that is activated during the transmission time.

The image sensing device may further include an interruption circuit configured to electrically decouple a common node from a current source included in the amplifier, during the transmission time.

The reference pixel may include a pixel disposed in a row adjacent to a row where the target pixel is disposed.

In accordance with an embodiment, an image sensing device may include: a plurality of pixels; an amplifier configured to sequentially amplify a plurality of pixel signals outputted from the plurality of pixels; a switching circuit configured to a first pixel of the plurality of pixels to the amplifier as a reference pixel and coupling a second pixel of the plurality of pixels to the amplifier as a target pixel, during respective row times; and a disable circuit configured to disable the amplifier during a part of the respective row times.

The part of the respective row times may include a transmission time in which charges accumulated in a photodiode of the target pixel are transmitted to a floating diffusion node of the target pixel.

The disable circuit may be coupled between a high voltage terminal and the amplifier, and is configured to electrically decouple the high voltage terminal from the amplifier during the part of the respective row times.

The image sensing device may further include a compensation circuit configured to supply a compensation current to a common node to which a current source included in the amplifier is coupled during the part of the respective row times.

The compensation circuit may include: a first switch coupled between a high voltage terminal and a coupling node, and configured to operate based on a first control signal having a fixed voltage level; and a second switch coupled between the coupling node and the common node, and configured to operate based on a second control signal activated during the part of the respective row times.

The image sensing device may further include an interruption circuit configured to electrically decouple a common node from a current source included in the amplifier, during the part of the respective row times.

The first pixel may be disposed in a first row adjacent to a second row where the second pixel is disposed.

In accordance with an embodiment, an operating method of an image sensing device may include: maintaining a voltage level of an output terminal of a target pixel at a reset level of the target pixel during a transmission time in which charges accumulated in a photodiode are transmitted to a floating diffusion node; and amplifying the voltage level of the output terminal from the reset level to a target level corresponding to the target pixel, during a readout period after the transmission time.

During the readout period, an amplifier coupled to the output terminal may be configured to be disabled, and the target pixel may be configured to be electrically decoupled from the output terminal.

During the readout period, a current generated from a current source included in the amplifier may be configured to be compensated for.

During the readout period, a current source included in the amplifier may be configured to be electrically decoupled from a common node to which the target pixel and the reference pixel are coupled.

DETAILED DESCRIPTION

Various embodiments are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
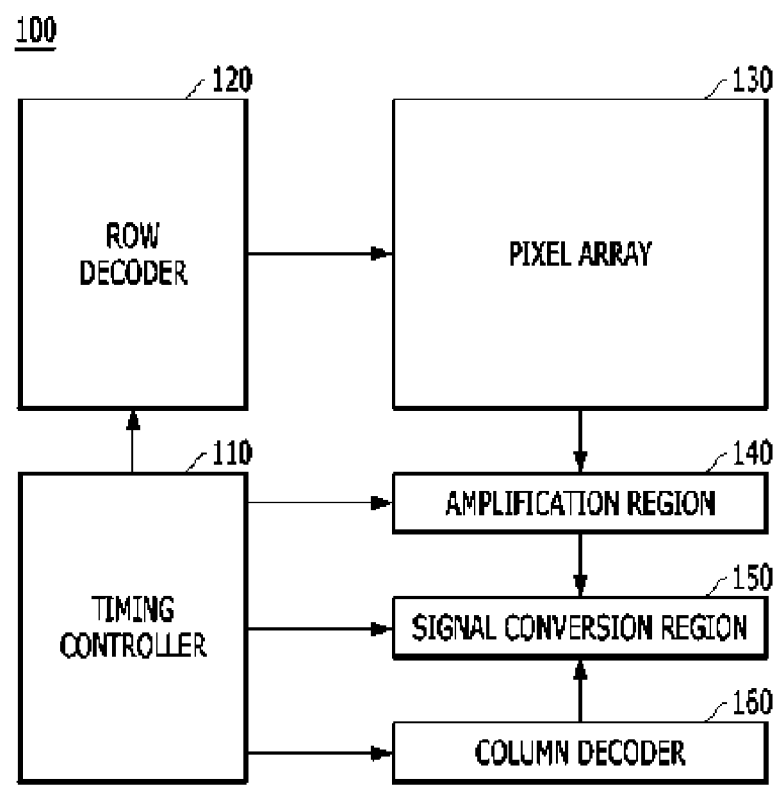
FIG. 1 is a block diagram illustrating an image sensing device in accordance with a first embodiment.

FIG. 1 is a block diagram illustrating an image sensing device 100 in accordance with a first embodiment.

Referring to FIG. 1, the image sensing device 100 may include a timing controller 110, a row decoder 120, a pixel array 130, an amplification region 140, a signal conversion region 150 and a column decoder 160.

The timing controller 110 may control overall operation of the image sensing device 100. The timing controller 110 is also referred to as a timing generator.

The row decoder 120 may control the pixel array 130 for each row. For example, the row decoder 120 may generate first row control signals for controlling pixels arranged in a first row of the pixel array 130, and generate $y^{th}$ row control signals for controlling pixels arranged in a $y^{th}$ row of the pixel array 130. Herein, "y" is a natural number greater than 2.

The pixel array 130 may include pixels arranged at intersections of a plurality of rows and a plurality of columns. The pixels may generate pixel signals for each row under the control of the row decoder 120.

The amplification region 140 may amplify gains of the pixel signals. For example, the amplification region 140 may couple a random first pixel of the pixels as a target pixel, couple a random second pixel of the pixels as a reference pixel, and amplify a gain of a pixel signal which is read out from the target pixel. The amplification region 140 may include a plurality of in-pixel amplifiers and a plurality of switching circuits, which correspond to the plurality of columns of the pixel array 130 (refer to FIGS. 2 and 3).

The signal conversion region 150 may convert analog-type pixel signals into digital-type signals. For example, the signal conversion region 150 may include a plurality of analog to digital converters (ADCs) corresponding to the plurality of columns of the pixel array 130.

The column decoder 160 may control the signal conversion region 150 for each column. For example, the column decoder 160 may sequentially control the plurality of ADCs.

Figure 2:
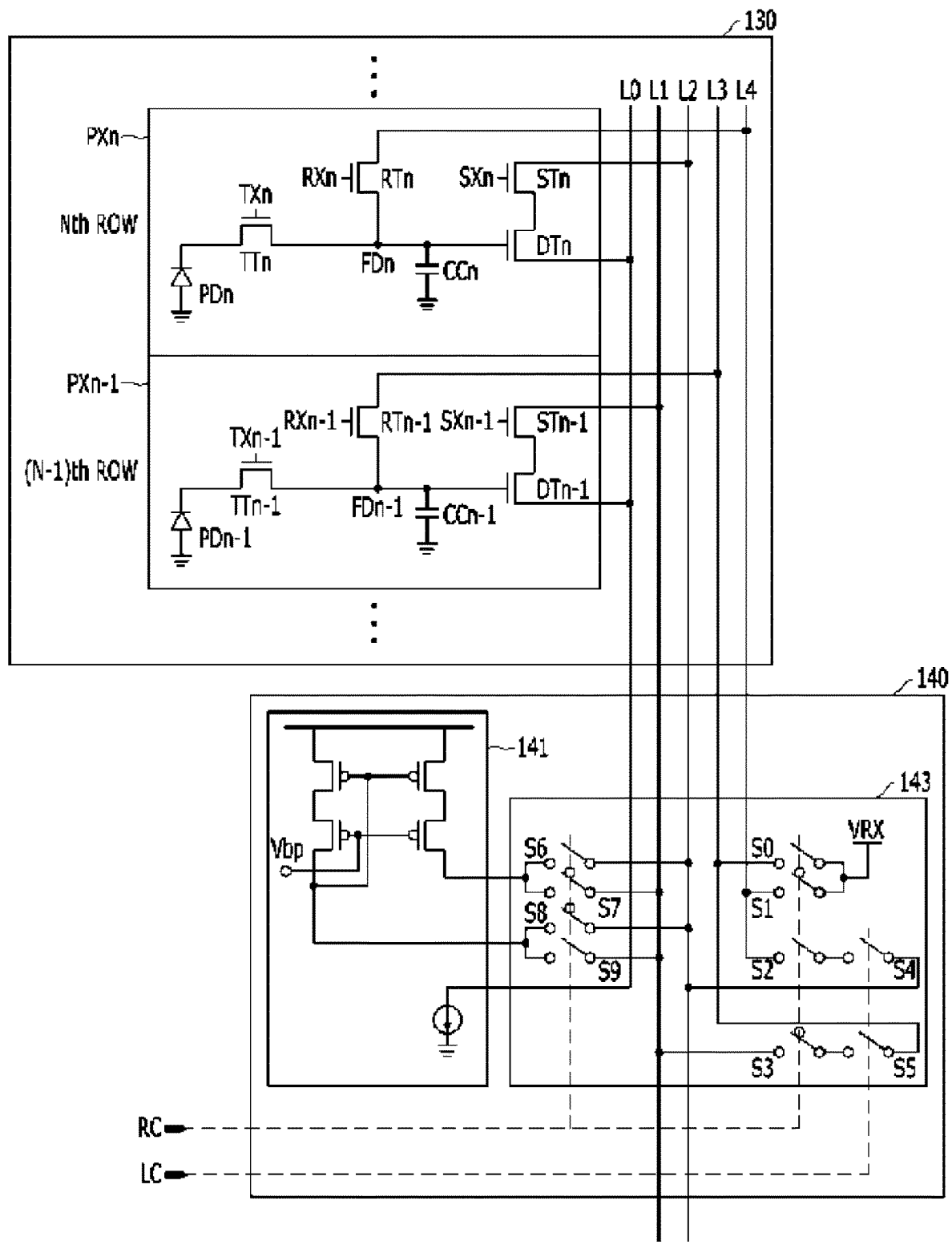
FIG. 2 is a circuit diagram illustrating an example of a pixel array and an amplification region illustrated in FIG. 1.

FIG. 2 is a circuit diagram illustrating an example of the pixel array 130 and the amplification region 140 illustrated in FIG. 1. For convenience in description, a circuit diagram corresponding to a portion of the pixel array 130 and a portion of the amplification region 140 is illustrated in FIG. 2. The portion of the pixel array 130 may include pixels corresponding to any one column of the plurality of columns, and the portion of the amplification region 140 may include an in-pixel amplifier 141 and a switching circuit 143, which correspond to the any one column.

The pixel array 130 may include pixels arranged in a column direction. Hereinafter, a pixel PXn arranged in an $n^{th}$ row among the pixels is referred to as an $n^{th}$ pixel, and a pixel PXn-1 arranged in an $(n-1)^{th}$ row among the pixels is referred to as an $(n-1)^{th}$ pixel. Herein, "n" is a natural number greater than 2. When the $n^{th}$ pixel PXn is the target pixel, the $(n-1)^{th}$ pixel PXn-1 may be the reference pixel. In other words, the target pixel and the reference pixel may be normal pixels arranged adjacent to each other in the column direction.

The $n^{th}$ pixel PXn may include an $n^{th}$ photodiode PDn, an $n^{th}$ transmission element TTn, an $n^{th}$ floating diffusion node FDn, an $n^{th}$ reset gate-controlled transistor element RTn, referenced hereinafter as a reset transistor element, an $n^{th}$ driving element DTn and an $n^{th}$ selection element STn.

The $n^{th}$ photodiode PDn may be coupled between a low voltage terminal, for example, a ground voltage terminal, and the $n^{th}$ transmission element TTn. For example, the $n^{th}$ photodiode PDn may generate charges, which correspond to incident light, during an $n^{th}$ integration time.

The $n^{th}$ transmission element TTn may be coupled between the $n^{th}$ photodiode PDn and the $n^{th}$ floating diffusion node FDn. The $n^{th}$ transmission element TTn may selectively couple the $n^{th}$ photodiode PDn to the $n^{th}$ floating diffusion node FDn based on an $n^{th}$ transmission control signal TXn. For example, the $n^{th}$ transmission element TTn may transmit the charges of the $n^{th}$ photodiode PDn to the $n^{th}$ floating diffusion node FDn during an $n^{th}$ transmission time Cn of an $n^{th}$ row time nth_RT.

The $n^{th}$ floating diffusion node FDn may be coupled to an $n^{th}$ capacitor CCn. The nth capacitor CCn may store the charges generated by the $n^{th}$ photodiode PDn. For example, the $n^{th}$ capacitor CCn may be a parasitic capacitor.

The $n^{th}$ reset transistor element RTn may be coupled between a fifth line L4 and the $n^{th}$ floating diffusion node FDn. The $n^{th}$ reset transistor element RTn may selectively couple the fifth line L4 to the $n^{th}$ floating diffusion node FDn based on an $n^{th}$ reset control signal RXn. For example, the $n^{th}$ reset transistor element RTn may electrically couple the fifth line L4 to the $n^{th}$ floating diffusion node FDn during an $n^{th}$ reset time (i.e., reset period) An of the $n^{th}$ row time nth_RT. During the reset time An, a reference voltage level at the floating diffusion node FDn is returned (reset) to a reference level so that a subsequent transmittal of charge from the $n^{th}$ photodiode PDn to the $n^{th}$ floating diffusion node FDn during a subsequent $n^{th}$ transmission time Cn can be measured relative to the reference level.

The $n^{th}$ driving element DTn may be coupled between a first line L0 and the $n^{th}$ selection element STn. The $n^{th}$ driving element DTn may generate an $n^{th}$ pixel signal corresponding to a voltage loaded on the $n^{th}$ floating diffusion node FDn.

The $n^{th}$ selection element STn may be coupled between the $n^{th}$ driving element DTn and a third line L2. The $n^{th}$ selection element STn may output the $n^{th}$ pixel signal to the third line L2 based on an $n^{th}$ STn may output an $n^{th}$ reset signal as the $n^{th}$ pixel signal during an $n^{th}$ reset readout time (i.e., reset readout period) Bn of the $n^{th}$ row time nth_RT, and output an $n^{th}$ data signal as the $n^{th}$ pixel signal during an $n^{th}$ data readout time (i.e., data readout period) Dn of the $n^{th}$ row time nth_RT.

The $n^{th}$ transmission control signal TXn, the $n^{th}$ reset control signal RXn and the $n^{th}$ selection control signal SXn may be $n^{th}$ row control signals generated by the row decoder 120.

The $(n-1)^{th}$ pixel PXn-1 may include an $(n-1)^{th}$ photodiode PDn-1, an $(n-1)^{th}$ transmission element TTn-1, an $(n-1)^{th}$ floating diffusion node FDn-1, an $(n-1)^{th}$ reset transistor element RTn-1, an $(n-1)^{th}$ driving element DTn-1 and an $(n-1)^{th}$ selection element STn-1.

The $(n-1)^{th}$ photodiode PDn-1 may be coupled between the low voltage terminal, for example, the ground voltage terminal, and the $(n-1)^{th}$ transmission element TTn-1. For example, the $(n-1)^{th}$ photodiode PDn-1 may generate charges, which correspond to incident light, during an $(n-1)^{th}$ integration time.

The $(n-1)^{th}$ transmission element TTn-1 may be coupled between the $(n-1)^{th}$ photodiode PDn-1 and the $(n-1)^{th}$ floating diffusion node FDn-1. The $(n-1)^{th}$ transmission element TTn-1 may selectively couple the $(n-1)^{th}$ photodiode PDn-1 to the $(n-1)^{th}$ floating diffusion node FDn-1 based on an $(n-1)^{th}$ transmission control signal TXn-1. For example, the $(n-1)^{th}$ transmission element TTn-1 may transmit the charges of the $(n-1)^{th}$ photodiode PDn-1 to the $(n-1)^{th}$ floating diffusion node FDn-1 during an $(n-1)^{th}$ transmission time of an $(n-1)^{th}$ row time (n-1)th_RT.

The $(n-1)^{th}$ floating diffusion node FDn-1 may be coupled to an $(n-1)^{th}$ capacitor CCn-1. The $(n-1)^{th}$ capacitor CCn-1 may store the charges generated by the $(n-1)^{th}$ photodiode PDn-1. For example, the $(n-1)^{th}$ capacitor CCn-1 may be a parasitic capacitor.

The $(n-1)^{th}$ reset transistor element RTn-1 may be coupled between a fourth line L3 and the $(n-1)^{th}$ floating diffusion node FDn-1. The $(n-1)^{th}$ reset transistor element RTn-1 may selectively couple the fourth line L3 to the $(n-1)^{th}$ floating diffusion node FDn-1 based on an $(n-1)^{th}$ reset control signal RXn-1. For example, the $(n-1)^{th}$ reset transistor element RTn-1 may electrically couple the fourth line L3 to the $(n-1)^{th}$ floating diffusion node FDn-1 during an $(n-1)^{th}$ reset time of the $(n-1)^{th}$ row time (n-1)th_RT. In addition, the $(n-1)^{th}$ reset transistor element RTn-1 may electrically couple the fourth line L3 to the $(n-1)^{th}$ floating diffusion node FDn-1 during the $n^{th}$ reset time An of the $n^{th}$ row time $n^{th}$ RT.

The $(n-1)^{th}$ driving element DTn-1 may be coupled between the first line L0 and the $(n-1)^{th}$ selection element STn-1. The $(n-1)^{th}$ driving element DTn-1 may generate an $(n-1)^{th}$ pixel signal corresponding to a voltage loaded on the $(n-1)^{th}$ floating diffusion node FDn-1.

The $(n-1)^{th}$ selection element STn-1 may be coupled between the $(n-1)^{th}$ driving element DTn-1 and a second line L1. The $(n-1)^{th}$ selection element STn-1 may output the $(n-1)^{th}$ pixel signal to the second line L1 based on an $(n-1)^{th}$ selection control signal SXn-1. For example, the $(n-1)^{th}$ selection element STn-1 may output an $(n-1)^{th}$ reset signal as the $(n-1)^{th}$ pixel signal during an $(n-1)^{th}$ reset readout time of the $(n-1)^{th}$ row time (n-1)th_RT, and output an $(n-1)^{th}$ data signal as the $(n-1)^{th}$ pixel signal during an $(n-1)^{th}$ data readout time of the $(n-1)^{th}$ row time (n-1)th_RT. In addition, the $(n-1)^{th}$ selection element STn-1 may electrically couple the $(n-1)^{th}$ driving element DTn-1 to the second line L1 during the $n^{th}$ row time nth_RT.

The $(n-1)^{th}$ transmission control signal TXn-1, the $(n-1)^{th}$ reset control signal RXn-1 and the $(n-1)^{th}$ selection control signal SXn-1 may be $(n-1)^{th}$ row control signals generated by the row decoder 120.

The amplification region 140 may include the in-pixel amplifier 141 and the switching circuit 143.

The in-pixel amplifier 141 may sequentially output the $(n-1)^{th}$ pixel signal and the $n^{th}$ pixel signal. For example, the in-pixel amplifier 141 may amplify a gain of the $(n-1)^{th}$ pixel signal during the $(n-1)^{th}$ row time (n-1)th_RT, and amplify a gain of the $n^{th}$ pixel signal during the $n^{th}$ row time nth_RT. Since the in-pixel amplifier 141 corresponds to a reference-shared in-pixel differential common source amplifier (RSDA) disclosed in the paper "A 0.50 erms Noise 1.45 µm-Pitch CMOS Image Sensor with Reference-Shared In-Pixel Differential Amplifier at 8.3 Mpixel 35 fps," a detailed description thereof is omitted.

The switching circuit 143 may include first to tenth switches S0 to S9. The first to fourth switches S0 to S3 and the seventh to tenth switches S6 to S9 may be controlled (closed or opened) based on a row change signal RC during for example a target row time such as the $n^{th}$ row time nth_RT, and the fifth and sixth switches S4 and S5 may be controlled based on a line decoupling signal LC. The row change signal RC and the line decoupling signal LC may be generated by the timing controller 110 shown in FIG. 1. Since the first to fourth switches S0 to S3 and the seventh to tenth switches S6 to S9 correspond to switches illustrated in FIG. 5.8.2 of the paper "A 0.50 erms Noise 1.45 µm-Pitch CMOS Image Sensor with Reference-Shared In-Pixel Differential Amplifier at 8.3 Mpixel 35 fps," detailed descriptions thereof are omitted. However, the first to fourth switches S0 to S3 and the seventh to tenth switches S6 to S9 are illustrated according to an RSDA mode disclosed in the paper.

The fifth switch S4 may be coupled between the second switch S2 and the third line L2. For example, the fifth switch S4 may electrically couple the second switch S2 to the third line L2 during the $n^{th}$ reset time An of the $n^{th}$ row time nth_RT, and electrically decouple the second switch S2 from the third line L2 during the other row times Bn, Cn and Dn of the $n^{th}$ row time nth_RT.

The sixth switch S5 may be coupled between the fourth switch S3 and the second line L1. For example, the sixth switch S5 may electrically couple the fourth switch S3 to the second line L1 during the $(n-1)^{th}$ reset time of the $(n-1)^{th}$ row time (n-1)th_RT, and electrically decouple the fourth switch S3 from the second line L1 during the other row times of the $(n-1)^{th}$ row time (n-1)th_RT.

Figure 3:
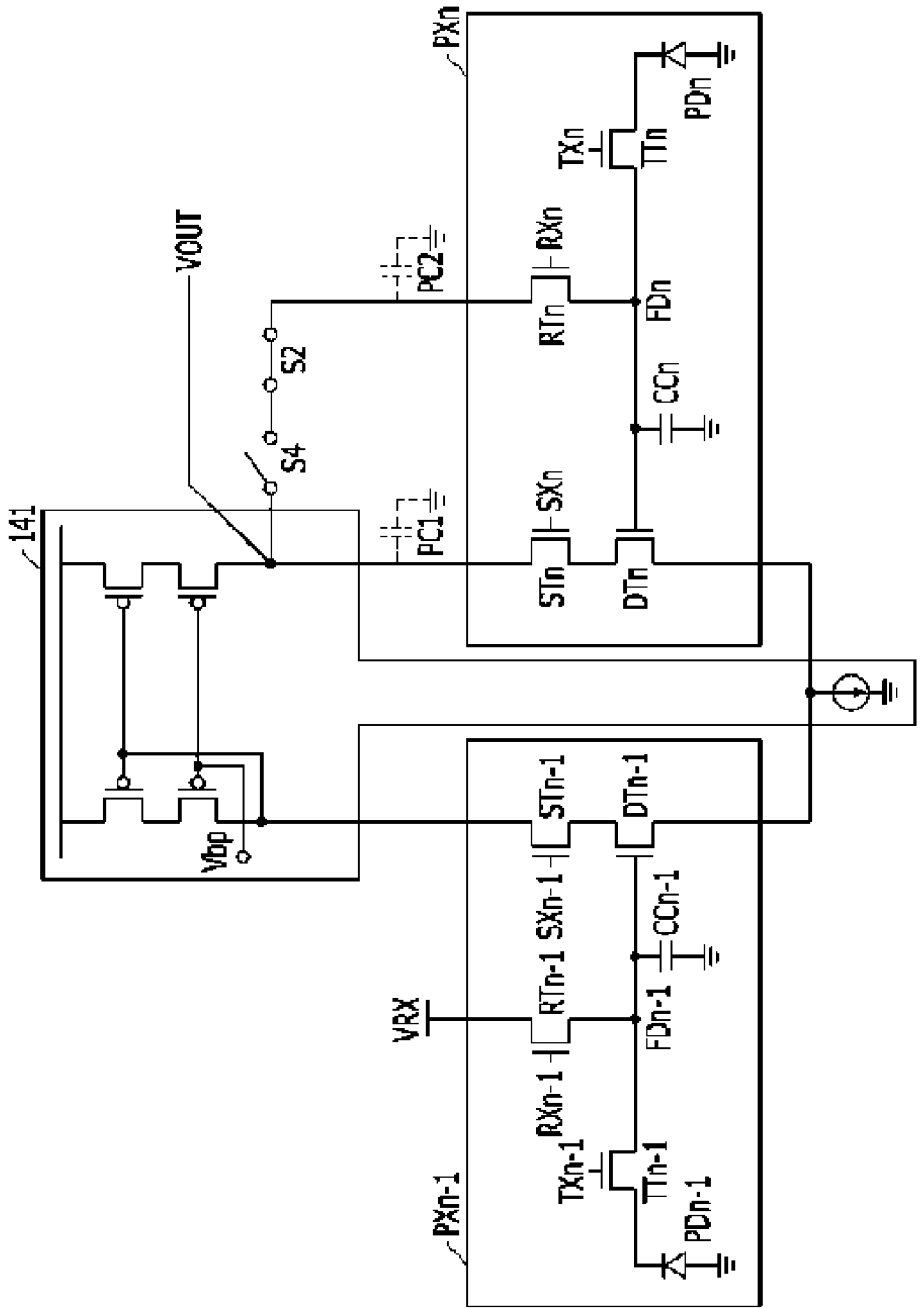
FIG. 3 is an equivalent circuit diagram illustrating an $(n-1)^{th}$ pixel, an $n^{th}$ pixel, an in-pixel amplifier and third and fifth switches illustrated in FIG. 2.

FIG. 3 is an equivalent circuit diagram illustrating the $(n-1)^{th}$ pixel PXn-1, the $n^{th}$ pixel PXn, the in-pixel amplifier 141 and the third and fifth switches S2 and S4 illustrated in FIG. 2. FIG. 3 illustrates a case where the $n^{th}$ pixel PXn is coupled to an output terminal VOUT of the in-pixel amplifier 141.

Referring to FIG. 3, while the third switch S2 may be shorted during the $n^{th}$ row time nth_RT, the fifth switch S4 may be shorted during an initial row time of the $n^{th}$ row time nth_RT, the initial row time including the $n^{th}$ reset time An, and the fifth switch S4 may be opened during the other row times of the $n^{th}$ row time nth_RT, the other row times including some or all of the $n^{th}$ reset readout time Bn, the $n^{th}$ transmission time Cn and the $n^{th}$ data readout time Dn. During the other row times, only the third line L2 may be coupled to the output terminal VOUT of the in-pixel amplifier 141. Accordingly, during the other row times, between a load caused by a first parasitic capacitor PC1 of the third line L2 and a load caused by a second parasitic capacitor PC2 of the fifth line L4, only the load caused by the first parasitic capacitor PC1 of the third line L2 may be reflected to the output terminal VOUT of the in-pixel amplifier 141 because the fifth switch S4 is open. In other words, during the other row times, the output terminal VOUT of the in-pixel amplifier 141 is not affected by the load caused by the second parasitic capacitor PC2 of the fifth line L4. Accordingly, the settling time of a pixel signal of the $n^{th}$ pixel PXn, which is read out through the output terminal VOUT, may be reduced, and thus a readout speed of the pixel signal may be improved.

Hereinafter, an operation of the image sensing device 100 in accordance with the first embodiment, which has the above-described configuration, is described with reference to FIG. 4.

Figure 4:
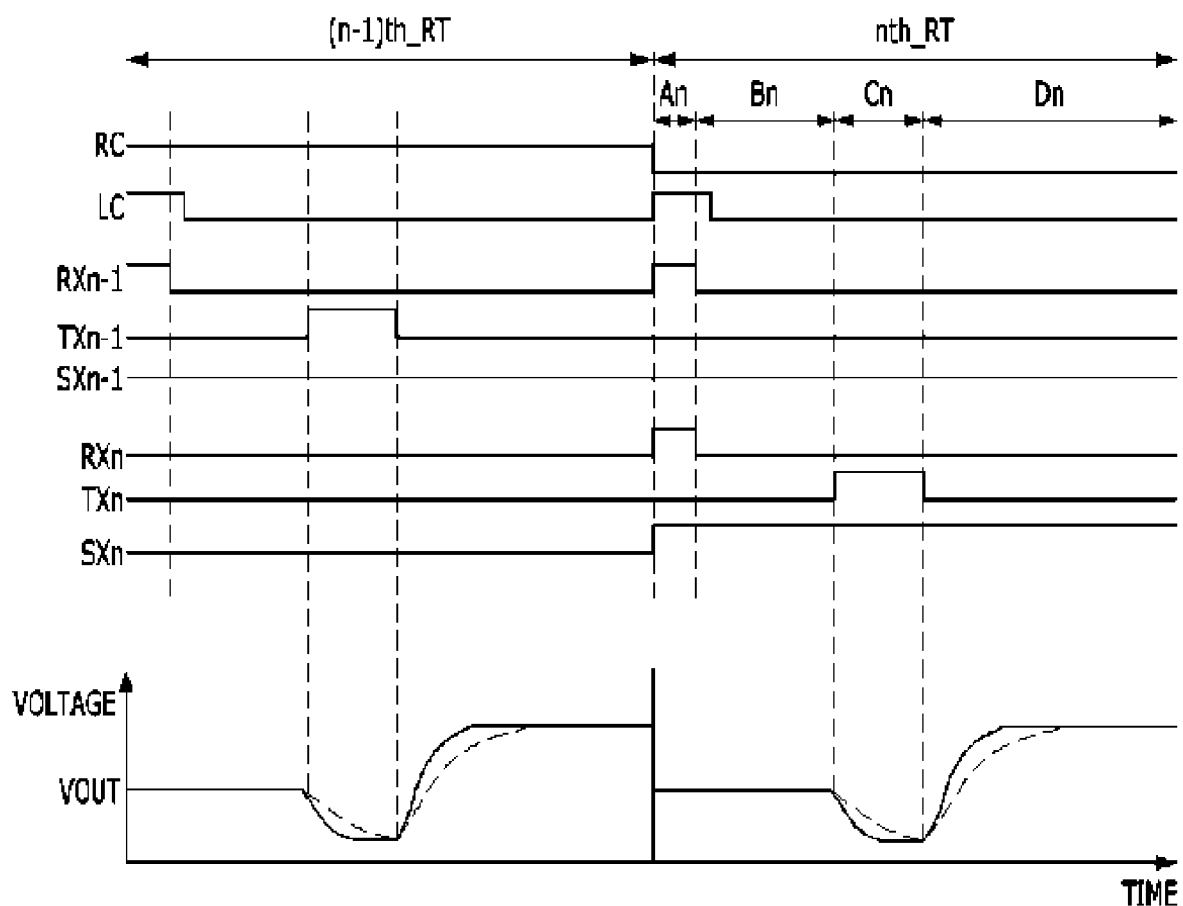
FIG. 4 is a timing diagram illustrating an operation of the image sensing device illustrated in FIG. 1.

FIG. 4 is a timing diagram illustrating the operation of the image sensing device 100 illustrated in FIG. 1. The case in which the $n^{th}$ pixel PXn is the target pixel is representatively described below.

Referring to FIG. 4, during the $n^{th}$ row time nth_RT, the $(n-1)^{th}$ pixel PXn-1 may be coupled to the in-pixel amplifier 141 as the reference pixel by the switching circuit 143, and the $n^{th}$ pixel PXn may be coupled to the in-pixel amplifier 141 as the target pixel by the switching circuit 143. During the $n^{th}$ row time nth_RT, the $(n-1)^{th}$ selection element STn-1 may be turned on based on the $(n-1)^{th}$ selection control signal SXn-1, and the $n^{th}$ selection element STn may be turned on based on the $n^{th}$ selection control signal SXn.

During an $n^{th}$ initial row time, that is, the $n^{th}$ reset time An, of the $n^{th}$ row time nth_RT, the $(n-1)^{th}$ reset transistor element RTn-1 may be turned on based on the $(n-1)^{th}$ reset control signal RXn-1, and the $n^{th}$ reset transistor element RTn may be turned on based on the $n^{th}$ reset control signal RXn. In addition, during the $n^{th}$ initial row time, that is, the $n^{th}$ reset time An, the fifth switch S4 included in the switching circuit 143 may be shorted based on the line decoupling signal LC. Accordingly, a negative feedback loop may be formed between the $n^{th}$ floating diffusion node FDn and the output terminal VOUT, and an offset may be stored in the $n^{th}$ floating diffusion node FDn. The offset may refer to a mismatch between the $(n-1)^{th}$ pixel PXn-1 and the $n^{th}$ pixel PXn. For reference, the offset may be canceled out through a correlated double sampling (CDS) operation.

During the other row times, that is, the $n^{th}$ reset readout time Bn, the $n^{th}$ transmission time Cn and the $n^{th}$ data readout time Dn, of the $n^{th}$ row time nth_RT, the fifth switch S4 may be opened based on the line decoupling signal LC. In this case, the line decoupling signal LC may transition from a high logic level to a low logic level during an initial period of the $n^{th}$ reset readout time Bn. The fifth switch S4 being opened minimizes a non-ideal effect of for example charge being unintentionally injected into the $n^{th}$ floating diffusion node FDn according to a switching operation.

During the other row times, the output terminal VOUT of the in-pixel amplifier 141 is not affected by the load caused by the second parasitic capacitor PC2 of the fifth line L4 between the load caused by the first parasitic capacitor PC1 of the third line L2 and the load caused by the second parasitic capacitor PC2 of the fifth line L4 because the fifth switch S4 is open during the other times. Particularly, during the $n^{th}$ data readout time Dn, the output terminal VOUT of the in-pixel amplifier 141 is not affected by the load caused by the second parasitic capacitor PC2 of the fifth line L4 because when the fifth switch S4 of switching circuit 143 is opened, the reset transistor element RTn is decoupled from the output terminal VOUT.

Accordingly, the settling time of the pixel signal of the $n^{th}$ pixel PXn, which is read out through the output terminal VOUT, may be reduced, and thus the readout speed of the pixel signal may be improved.

According to the first embodiment, there is an advantage of minimizing a load reflected to an output terminal during a period in which a pixel signal is read out, the period including at least a data readout time.

Figure 5:
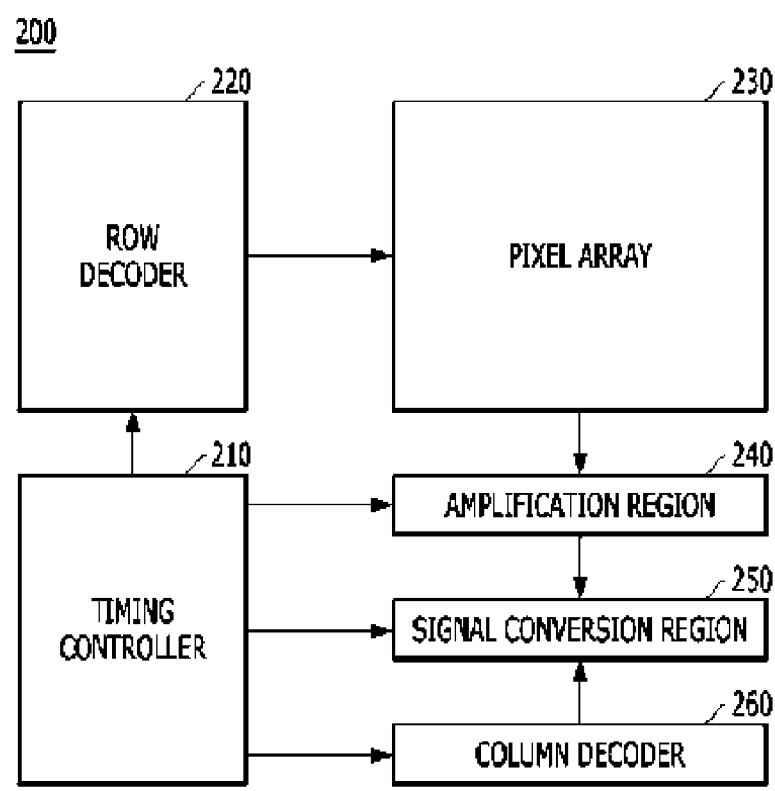
FIG. 5 is a block diagram illustrating an image sensing device in accordance with a second embodiment.

FIG. 5 is a block diagram illustrating an image sensing device 200 in accordance with a second embodiment.

Referring to FIG. 5, the image sensing device 200 may include a timing controller 210, a row decoder 220, a pixel array 230, an amplification region 240, a signal conversion region 250 and a column decoder 260.

The timing controller 210 may control overall operation of the image sensing device 200. The timing controller 210 is also referred to as a timing generator.

The row decoder 220 may control the pixel array 230 for each row. For example, the row decoder 220 may generate first row control signals for controlling pixels arranged in a first row of the pixel array 230, and generate $y^{th}$ row control signals for controlling pixels arranged in a $y^{th}$ row of the pixel array 230. Herein, "y" is a natural number greater than 2.

The pixel array 230 may include pixels arranged at intersections of a plurality of rows and a plurality of columns. The pixels may generate pixel signals for each row under the control of the row decoder 220.

The amplification region 240 may amplify gains of the pixel signals. For example, the amplification region 240 may access a random first pixel of the pixels as a target pixel, access a random second pixel of the pixels as a reference pixel, and amplify a gain of a pixel signal which is read out from the target pixel. The amplification region 240 may include a plurality of in-pixel amplifiers and a plurality of switching circuits, which correspond to the plurality of columns of the pixel array 230 (refer to FIG. 7 or FIG. 9).

The signal conversion region 250 may convert analog-type pixel signals into digital-type signals. For example, the signal conversion region 250 may include a plurality of analog to digital converters (ADCs) corresponding to the plurality of columns of the pixel array 230.

The column decoder 260 may control the signal conversion region 250 for each column. For example, the column decoder 260 may sequentially control the plurality of ADCs.

Figure 6:
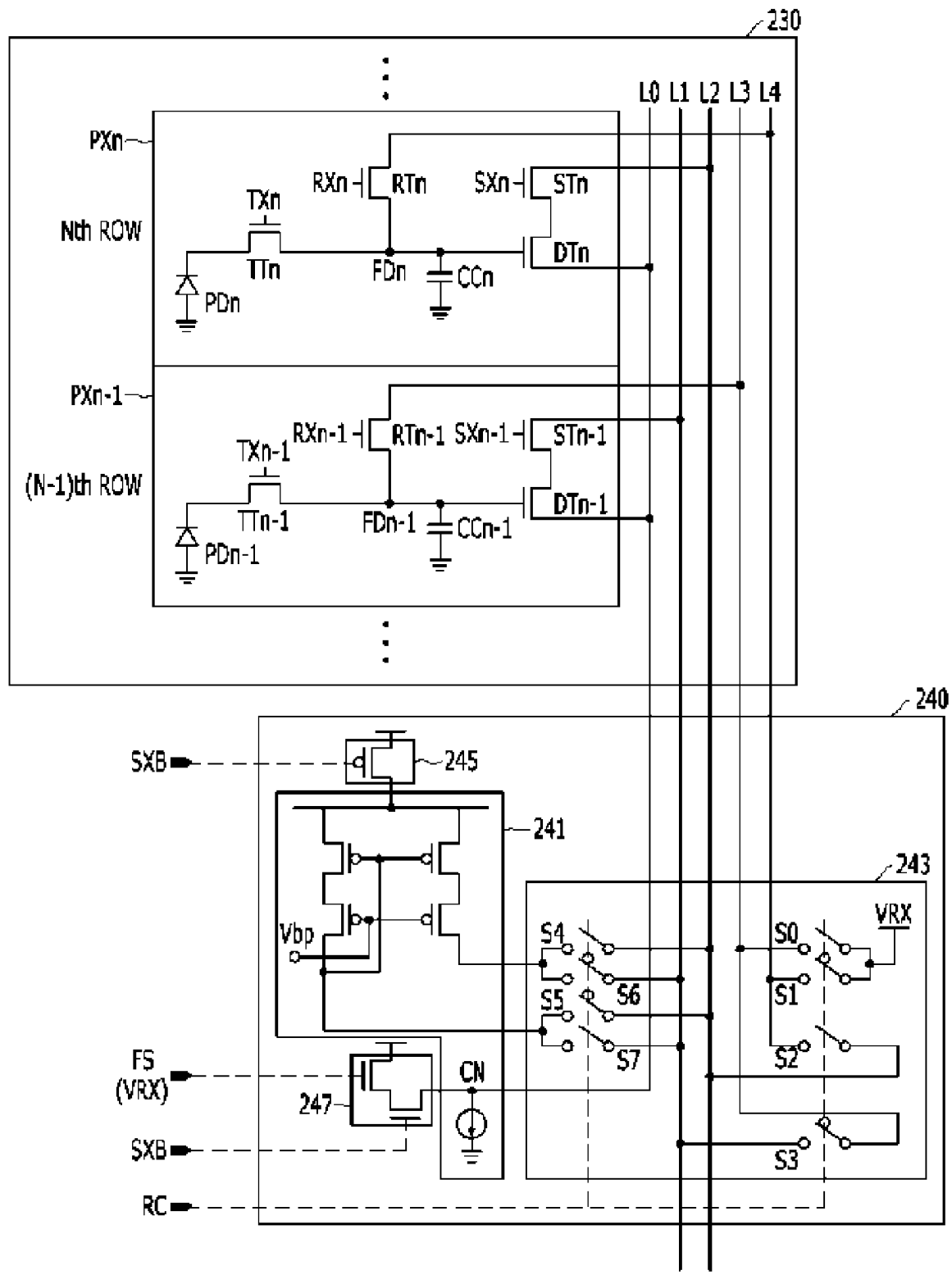
FIG. 6 is a circuit diagram illustrating an example of a pixel array and an amplification region illustrated in FIG. 5.

FIG. 6 is a circuit diagram illustrating an example of the pixel array 230 and the amplification region 240 illustrated in FIG. 5. For convenience in description, a circuit diagram corresponding to a portion of the pixel array 230 and a portion of the amplification region 240 is illustrated in FIG. 6. The portion of the pixel array 230 may include pixels corresponding to any one column of the plurality of columns, and the portion of the amplification region 240 may include an in-pixel amplifier 241, a disable circuit 245, a compensation circuit 247 and a switching circuit 243, which correspond to the any one column.

The pixel array 230 may include pixels arranged in a column direction. Hereinafter, a pixel PXn arranged in an $n^{th}$ row among the pixels is referred to as an $n^{th}$ pixel, and a pixel PXn-1 arranged in an $(n-1)^{th}$ row among the pixels is referred to as an $(n-1)^{th}$ pixel. Herein, "n" is a natural number greater than 2. When the $n^{th}$ pixel PXn is the target pixel, the $(n-1)^{th}$ pixel PXn-1 may be the reference pixel. In other words, the target pixel and the reference pixel may be normal pixels arranged adjacent to each other in the column direction.

The $n^{th}$ pixel PXn may include an $n^{th}$ photodiode PDn, an $n^{th}$ transmission element TTn, an $n^{th}$ floating diffusion node FDn, an $n^{th}$ reset transistor element RTn, an $n^{th}$ driving element DTn and an $n^{th}$ selection element STn.

The $n^{th}$ photodiode PDn may be coupled between a low voltage terminal, for example, a ground voltage terminal, and the $n^{th}$ transmission element TTn. For example, the $n^{th}$ photodiode PDn may generate charges, which correspond to incident light, during an $n^{th}$ integration time.

The $n^{th}$ transmission element TTn may be coupled between the $n^{th}$ photodiode PDn and the $n^{th}$ floating diffusion node FDn. The $n^{th}$ transmission element TTn may selectively couple the $n^{th}$ photodiode PDn to the $n^{th}$ floating diffusion node FDn based on an $n^{th}$ transmission control signal TXn. For example, the $n^{th}$ transmission element TTn may transmit the charges of the $n^{th}$ photodiode PDn to the $n^{th}$ floating diffusion node FDn during an $n^{th}$ transmission time Cn of an $n^{th}$ row time nth_RT.

The $n^{th}$ floating diffusion node FDn may be coupled to an $n^{th}$ capacitor CCn. The $n^{th}$ capacitor CCn may store the charges generated by the $n^{th}$ photodiode PDn. For example, the $n^{th}$ capacitor CCn may be a parasitic capacitor.

The $n^{th}$ reset transistor element RTn may be coupled between a fifth line L4 and the $n^{th}$ floating diffusion node FDn. The $n^{th}$ reset transistor element RTn may selectively couple the fifth line L4 to the $n^{th}$ floating diffusion node FDn based on an $n^{th}$ reset control signal RXn. For example, the $n^{th}$ reset transistor element RTn may electrically couple the fifth line L4 to the $n^{th}$ floating diffusion node FDn during an $n^{th}$ reset time An of the $n^{th}$ row time nth_RT.

The $n^{th}$ driving element DTn may be coupled between a first line L0 and the $n^{th}$ selection element STn. The $n^{th}$ driving element DTn may generate an $n^{th}$ pixel signal corresponding to a voltage loaded on the $n^{th}$ floating diffusion node FDn.

The $n^{th}$ selection element STn may be coupled between the $n^{th}$ driving element DTn and a third line L2. The $n^{th}$ selection element STn may output the $n^{th}$ pixel signal to the third line L2 based on an $n^{th}$ STn may output an $n^{th}$ reset signal as the $n^{th}$ pixel signal during an $n^{th}$ reset readout time Bn of the $n^{th}$ row time nth_RT, and output an $n^{th}$ data signal as the $n^{th}$ pixel signal during an $n^{th}$ data readout time Dn of the $n^{th}$ row time nth_RT.

The $n^{th}$ transmission control signal TXn, the $n^{th}$ reset control signal RXn and the $n^{th}$ selection control signal SXn may be $n^{th}$ row control signals generated by the row decoder 220.

The $(n-1)^{th}$ pixel PXn-1 may include an $(n-1)^{th}$ photodiode PDn-1, an $(n-1)^{th}$ transmission element TTn-1, an $(n-1)^{th}$ floating diffusion node FDn-1, an $(n-1)^{th}$ reset transistor element RTn-1, an $(n-1)^{th}$ driving element DTn-1 and an $(n-1)^{th}$ selection element STn-1.

The $(n-1)^{th}$ photodiode PDn-1 may be coupled between the low voltage terminal, for example, the ground voltage terminal, and the $(n-1)^{th}$ transmission element TTn-1. For example, the $(n-1)^{th}$ photodiode PDn-1 may generate charges, which correspond to incident light, during an $(n-1)^{th}$ integration time.

The $(n-1)^{th}$ transmission element TTn-1 may be coupled between the $(n-1)^{th}$ photodiode PDn-1 and the $(n-1)^{th}$ floating diffusion node FDn-1. The $(n-1)^{th}$ transmission element TTn-1 may selectively couple the $(n-1)^{th}$ photodiode PDn-1 to the $(n-1)^{th}$ floating diffusion node FDn-1 based on an $(n-1)^{th}$ transmission control signal TXn-1. For example, the $(n-1)^{th}$ transmission element TTn-1 may transmit the charges of the $(n-1)^{th}$ photodiode PDn-1 to the $(n-1)^{th}$ floating diffusion node FDn-1 during an $(n-1)^{th}$ transmission time of an $(n-1)^{th}$ row time.

The $(n-1)^{th}$ floating diffusion node FDn-1 may be coupled to an $(n-1)^{th}$ capacitor CCn-1. The $(n-1)^{th}$ capacitor CCn-1 may store the charges generated by the $(n-1)^{th}$ photodiode PDn-1. For example, the $(n-1)^{th}$ capacitor CCn-1 may be a parasitic capacitor.

The $(n-1)^{th}$ reset transistor element RTn-1 may be coupled between a fourth line L3 and the $(n-1)^{th}$ floating diffusion node FDn-1. The $(n-1)^{th}$ reset transistor element RTn-1 may selectively couple the fourth line L3 to the $(n-1)^{th}$ floating diffusion node FDn-1 based on an $(n-1)^{th}$ reset control signal RXn-1. For example, the $(n-1)^{th}$ reset transistor element RTn-1 may electrically couple the fourth line L3 to the $(n-1)^{th}$ floating diffusion node FDn-1 during an $(n-1)^{th}$ reset time of the $(n-1)^{th}$ row time. In addition, the $(n-1)^{th}$ reset transistor element RTn-1 may electrically couple the fourth line L3 to the $(n-1)^{th}$ floating diffusion node FDn-1 during the $n^{th}$ reset time An of the $n^{th}$ row time nth_RT.

The $(n-1)^{th}$ driving element DTn-1 may be coupled between the first line L0 and the $(n-1)^{th}$ selection element STn-1. The $(n-1)^{th}$ driving element DTn-1 may generate an $(n-1)^{th}$ pixel signal corresponding to a voltage loaded on the $(n-1)^{th}$ floating diffusion node FDn-1.

The $(n-1)^{th}$ selection element STn-1 may be coupled between the $(n-1)^{th}$ driving element DTn-1 and a second line L1. The $(n-1)^{th}$ selection element STn-1 may output the $(n-1)^{th}$ pixel signal to the second line L1 based on an $(n-1)^{th}$ selection control signal SXn-1. For example, the $(n-1)^{th}$ selection element STn-1 may output an $(n-1)^{th}$ reset signal as the $(n-1)^{th}$ pixel signal during an $(n-1)^{th}$ reset readout time of the $(n-1)^{th}$ row time, and output an $(n-1)^{th}$ data signal as the $(n-1)^{th}$ pixel signal during an $(n-1)^{th}$ data readout time of the $(n-1)^{th}$ row time. In addition, the $(n-1)^{th}$ selection element STn-1 may electrically couple the $(n-1)^{th}$ driving element DTn-1 to the second line L1 during the $n^{th}$ row time nth_RT.

The $(n-1)^{th}$ transmission control signal TXn-1, the $(n-1)^{th}$ reset control signal RXn-1 and the $(n-1)^{th}$ selection control signal SXn-1 may be $(n-1)^{th}$ row control signals generated by the row decoder 220.

The amplification region 240 may include the in-pixel amplifier 241, the disable circuit 245, the compensation circuit 247 and the switching circuit 243.

The in-pixel amplifier 241 may sequentially output the $(n-1)^{th}$ pixel signal and the $n^{th}$ pixel signal. For example, the in-pixel amplifier 241 may amplify a gain of the $(n-1)^{th}$ pixel signal during the $(n-1)^{th}$ row time, and amplify a gain of the $n^{th}$ pixel signal during the $n^{th}$ row time nth_RT. Since the in-pixel amplifier 241 corresponds to a reference-shared in-pixel differential common source amplifier (RSDA) disclosed in the paper "A 0.50 erms Noise 1.45 µm-Pitch CMOS Image Sensor with Reference-Shared In-Pixel Differential Amplifier at 8.3 Mpixel 35 fps," a detailed description thereof is omitted.

The disable circuit 245 may disable the in-pixel amplifier 241 for each transmission time. For example, the disable circuit 245 may disable the in-pixel amplifier 241 during the $(n-1)^{th}$ transmission time, and disable the in-pixel amplifier 241 during the $n^{th}$ transmission time Cn. The disable circuit 245 is described in more detail below.

The compensation circuit 247 may supply a compensation current to a common node CN for each transmission time. The compensation circuit 247 is described in more detail below.

The switching circuit 243 may include first to eighth switches S0 to S7. The first to eighth switches S0 to S7 may be controlled based on a row change signal RC. The row change signal RC may be generated by the timing controller 210. Since the first to eighth switches S0 to S7 correspond to switches illustrated in FIG. 5.8.2 of the paper "A 0.50 erms Noise 1.45 µm-Pitch CMOS Image Sensor with Reference-Shared In-Pixel Differential Amplifier at 8.3 Mpixel 35 fps," detailed descriptions thereof are omitted. However, the switching circuit 243 is illustrated according to an RSDA mode disclosed in the paper.

Figure 7:
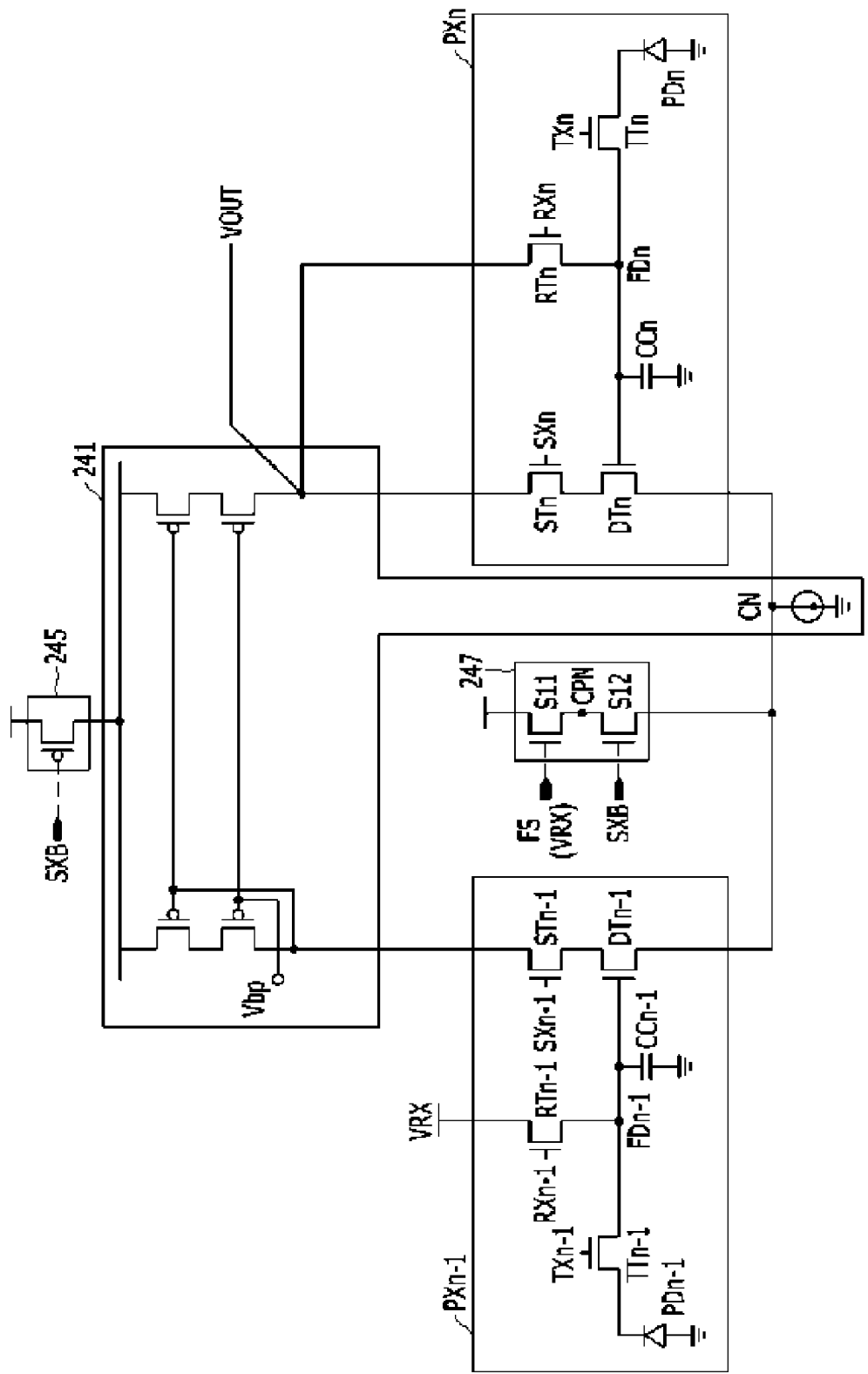
FIG. 7 is an equivalent circuit diagram illustrating an $(n-1)^{th}$ pixel, an $n^{th}$ pixel, an in-pixel amplifier, a disable circuit and a compensation circuit illustrated in FIG. 6.

FIG. 7 is an equivalent circuit diagram illustrating the $(n-1)^{th}$ pixel PXn-1, the $n^{th}$ pixel PXn, the in-pixel amplifier 241, the disable circuit 245 and the compensation circuit 247 illustrated in FIG. 6. FIG. 7 illustrates a case where the $n^{th}$ pixel PXn is coupled to an output terminal VOUT of the in-pixel amplifier 241.

Referring to FIG. 7, the $(n-1)^{th}$ pixel PXn-1 may be coupled between any one of two output terminals of the in-pixel amplifier 241 and the common node CN of the in-pixel amplifier 241. When the $(n-1)^{th}$ pixel PXn-1 is used as the reference pixel, the $(n-1)^{th}$ reset transistor element RTn-1 included in the $(n-1)^{th}$ pixel PXn-1 may be coupled to a high voltage terminal VRX for reset.

The $n^{th}$ pixel PXn may be coupled between the other output terminal VOUT of the two output terminals and the common node CN. When the $n^{th}$ pixel PXn is used as the target pixel, the $n^{th}$ reset transistor element RTn included in the $n^{th}$ pixel PXn may be coupled to the output terminal VOUT.

The disable circuit 245 may be coupled between a high voltage terminal and the in-pixel amplifier 241. The disable circuit 245 may electrically decouple the high voltage terminal from the in-pixel amplifier 241 during the $n^{th}$ transmission time Cn. For example, the disable circuit 245 may include a PMOS transistor. The PMOS transistor may have a gate terminal for receiving a disable signal SXB activated for each transmission time, and a source terminal and a drain terminal coupled between the high voltage terminal and the in-pixel amplifier 241. The disable signal SXB may be generated by the timing controller 210.

The compensation circuit 247 may be coupled between the high voltage terminal and the common node CN. The compensation circuit 247 may prevent power fluctuation caused by the disable circuit 245, for each transmission time. For example, the compensation circuit 247 may include a first switch S11 and a second switch S12.

The first switch S11 may be coupled between the high voltage terminal and a coupling node CPN. The first switch S11 may operate based on a first control signal FS having a fixed voltage level. For example, the first control signal FS may have a high voltage supplied from the high voltage terminal VRX for reset. For example, the first switch S11 may include an NMOS transistor. The NMOS transistor may have a gate terminal for receiving the first control signal FS, and a source terminal and a drain terminal coupled between the high voltage terminal and the coupling node CPN.

The second switch S12 may be coupled between the coupling node CPN and the common node CN. The second switch S12 may operate based on the disable signal SXB. For example, the second switch S12 may include an NMOS transistor. The NMOS transistor may have a gate terminal for receiving the disable signal SXB, and a source terminal and a drain terminal coupled between the coupling node CPN and the common node CN.

Figure 8:
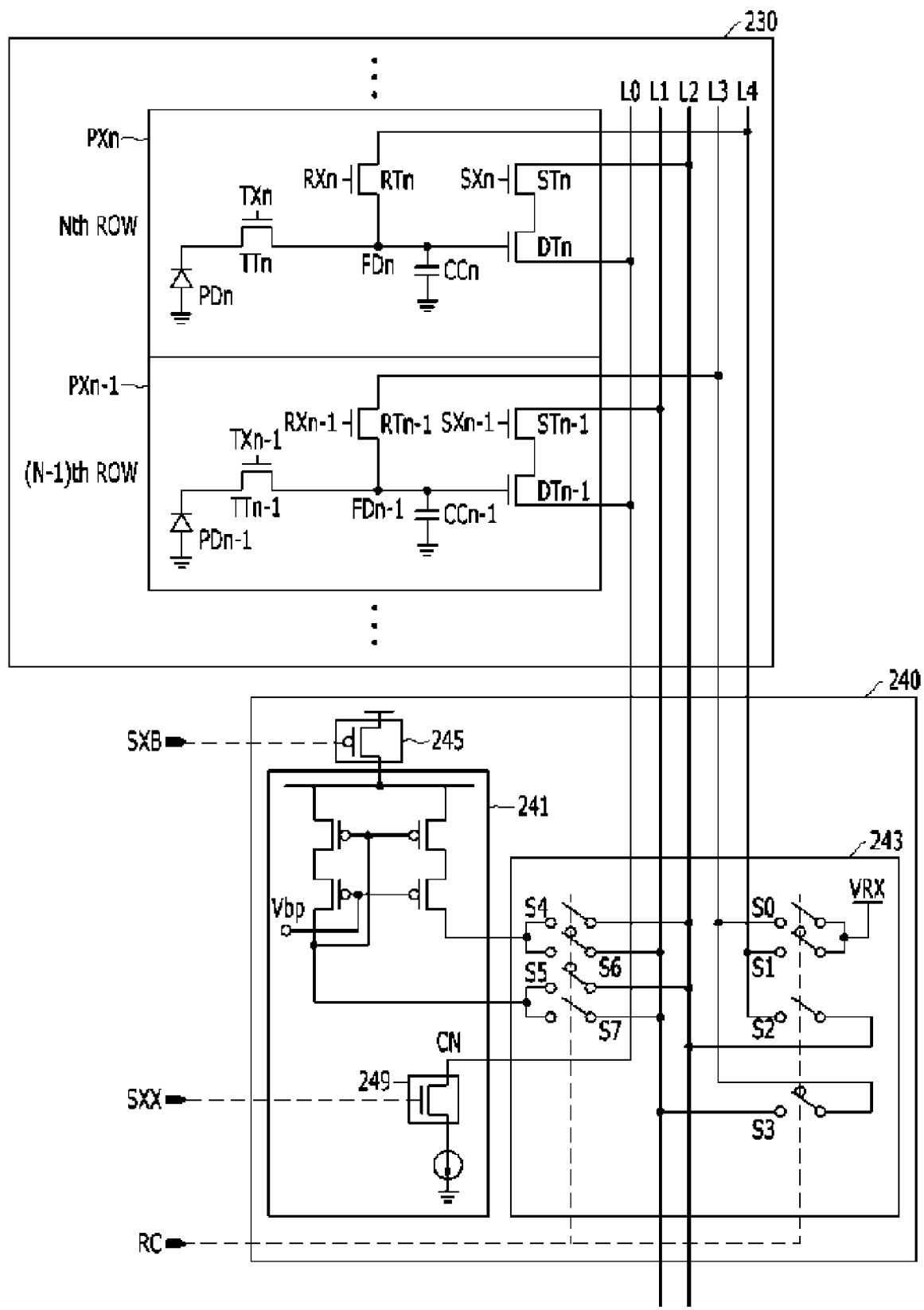
FIG. 8 is a circuit diagram illustrating another example of a pixel array and an amplification region illustrated in FIG. 5.

FIG. 8 is a circuit diagram illustrating another example of the pixel array 230 and the amplification region 240 illustrated in FIG. 5. A circuit diagram corresponding to a portion of the pixel array 230 and a portion of the amplification region 240 is illustrated in FIG. 8. The portion of the pixel array 230 may include pixels corresponding to any one column of the plurality of columns, and the portion of the amplification region 240 may include an in-pixel amplifier 241, a disable circuit 245, an interruption circuit 249 and a switching circuit 243, which correspond to the any one column. Hereinafter, only the interruption circuit 249, which is a configuration different from that of FIG. 6, is described.

The interruption circuit 249 may electrically decouple the common node CN from a current source for each transmission time. The interruption circuit 249 is described in more detail with reference to FIG. 9.

Figure 9:
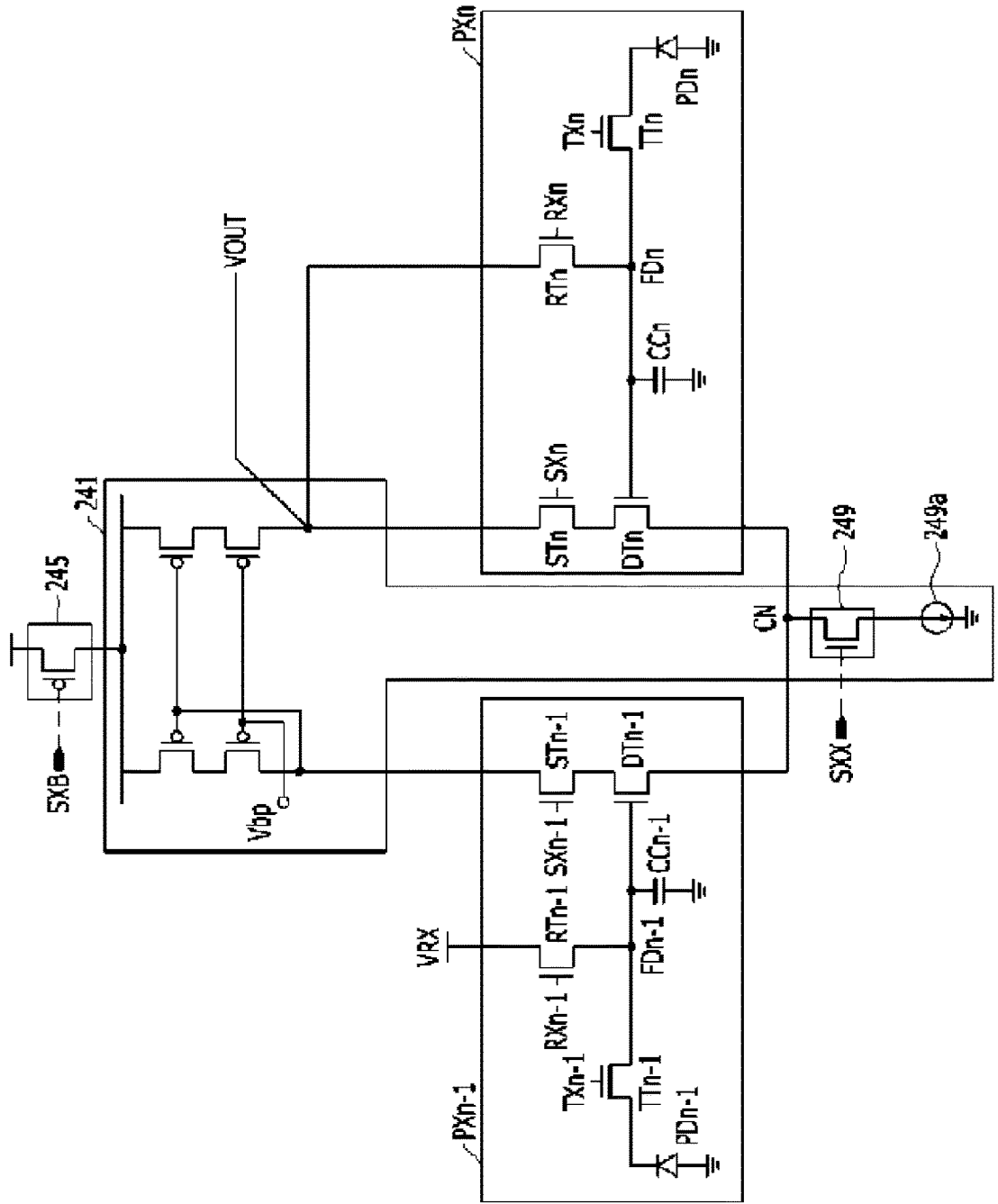
FIG. 9 is an equivalent circuit diagram illustrating an $(n-1)^{th}$ pixel, an $n^{th}$ pixel, an in-pixel amplifier, a disable circuit and an interruption circuit illustrated in FIG. 8.

FIG. 9 is an equivalent circuit diagram illustrating the $(n-1)^{th}$ pixel PXn-1, the $n^{th}$ pixel PXn, the in-pixel amplifier 241, the disable circuit 243 and the interruption circuit 249 illustrated in FIG. 8. FIG. 9 illustrates a case in which the $n^{th}$ pixel PXn is coupled to the output terminal VOUT of the in-pixel amplifier 241. Hereinafter, only the interruption circuit 249, which is a configuration different from that of FIG. 7, is described.

Referring to FIG. 9, the interruption circuit 249 may be coupled between the common node CN and the current source 249a, which are included in the in-pixel amplifier 241. The interruption circuit 249 may prevent fluctuation of the common node CN caused by the disable circuit 245, for each transmission time. For example, the interruption circuit 249 may include an NMOS transistor. The NMOS transistor may have a gate terminal for receiving an interruption control signal SXX, and a source terminal and a drain terminal coupled between the common node CN and the current source 249a. The interruption control signal SXX may be generated by the timing controller 210.

Hereinafter, an operation of the image sensing device 200 in accordance with the second embodiment, which has the above-described configuration, is described with reference to FIGS. 10 and 11.

Figure 10:
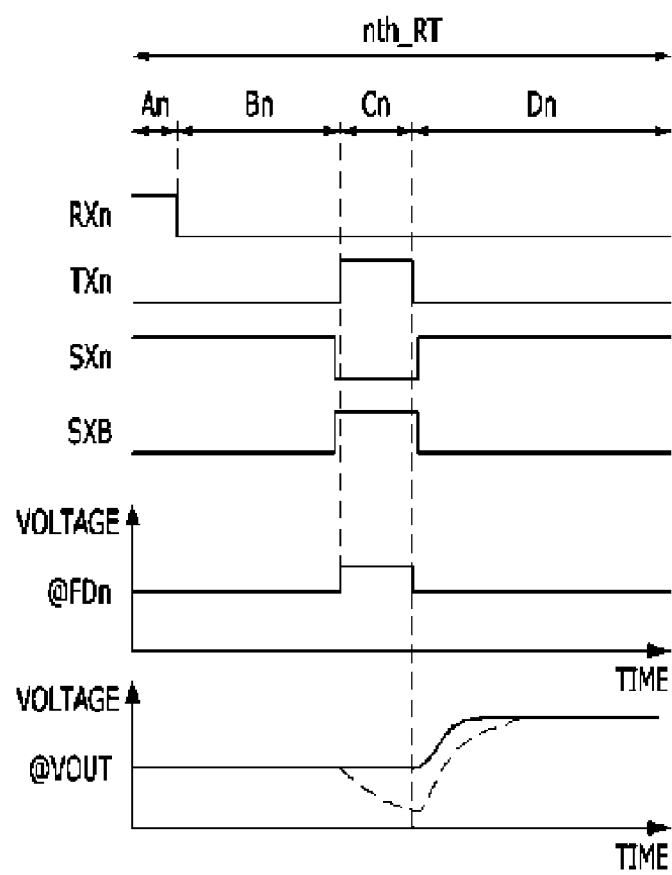
FIG. 10 is a timing diagram illustrating an example of an operation of the image sensing device illustrated in FIG. 5.

FIG. 10 is a timing diagram illustrating an example of the operation of the image sensing device 200 illustrated in FIG. 5. For convenience in description, a case in which the $n^{th}$ pixel PXn is the target pixel is representatively described.

Referring to FIG. 10, during the $n^{th}$ row time nth_RT, the $(n-1)^{th}$ pixel PXn-1 may be coupled to the in-pixel amplifier 241 as the reference pixel by the switching circuit 243, and the $n^{th}$ pixel PXn may be coupled to the in-pixel amplifier 241 as the target pixel by the switching circuit 243. During the $n^{th}$ row time nth_RT, the $(n-1)^{th}$ selection element STn-1 may be turned on based on the $(n-1)^{th}$ selection control signal SXn-1, and the $n^{th}$ selection element STn may be turned on based on the $n^{th}$ selection control signal SXn and made during one or more times of respective row processing signals including the reset time An, the reset readout time Bn, the transmission time Cn, and data readout time Dn.

The $n^{th}$ row time nth_RT may include the $n^{th}$ reset time An, the $n^{th}$ reset readout time Bn, the $n^{th}$ transmission time Cn and the $n^{th}$ data readout time Dn.

During the $n^{th}$ reset time An, the $n^{th}$ pixel PXn may store an offset in the $n^{th}$ floating diffusion node FDn based on the $n^{th}$ reset control signal RXn.

During the $n^{th}$ reset readout time Bn, the $n^{th}$ pixel PXn may generate a pixel signal, which corresponds to a reset level, according to a voltage loaded on the $n^{th}$ floating diffusion node FDn.

During the $n^{th}$ transmission time Cn, the $n^{th}$ pixel PXn may transmit the charges, which are accumulated in the $n^{th}$ photodiode PDn, to the $n^{th}$ floating diffusion node FDn based on the $n^{th}$ transmission control signal TXn. At this time, the disable circuit 245 may disable the in-pixel amplifier 241 based on the disable signal SXB. For example, the disable circuit 245 may electrically decouple the high voltage terminal from the in-pixel amplifier 241 during the $n^{th}$ transmission time Cn. The compensation circuit 247 may supply a compensation current to the common node CN during the $n^{th}$ transmission time Cn, thereby preventing power fluctuation that affects the current source as power supplied to the in-pixel amplifier 241, that is, the high voltage, is cut off. The $n^{th}$ pixel PXn may be electrically decoupled from the output terminal VOUT based on the $n^{th}$ selection control signal SXn. Accordingly, during the $n^{th}$ transmission time Cn, a voltage level of the output terminal VOUT may be maintained at the reset level. For example, the voltage level of the output terminal VOUT may hold the reset level by a parasitic capacitor coupled to the output terminal VOUT.

During the $n^{th}$ data readout time Dn, the $n^{th}$ pixel PXn may generate the pixel signal, which corresponds to the target level, that is, a data level of the pixel signal, according to the voltage loaded on the $n^{th}$ floating diffusion node FDn. At this time, the voltage level of the output terminal VOUT from which the pixel signal is outputted may be raised (or amplified) from the reset level to the target level, thereby minimizing the settling time for the pixel signal to reach the target level. In other words, during the $n^{th}$ data readout time Dn, since an operating range or a swing range (refer to the dotted line for VOUT in FIG. 10) of the voltage level of the output terminal VOUT may be reduced to an effective output range (refer to the solid line for VOUT in FIG. 10), the settling time may be minimized.

Figure 11:
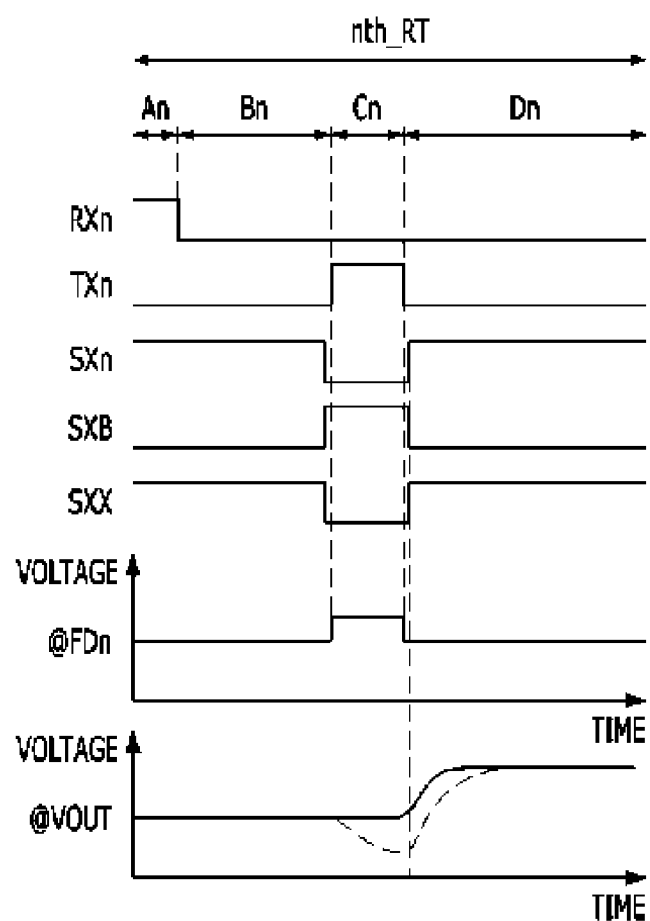
FIG. 11 is a timing diagram illustrating another example of an operation of the image sensing device illustrated in FIG. 5.

FIG. 11 is a timing diagram illustrating still another example of the operation of the image sensing device 200 illustrated in FIG. 5. A case in which the $n^{th}$ pixel PXn is the target pixel is representatively described.

Referring to FIG. 11, during the $n^{th}$ row time nth_RT, the $(n-1)^{th}$ pixel PXn−1 may be coupled to the in-pixel amplifier 241 as the reference pixel by the switching circuit 243, and the $n^{th}$ pixel PXn may be coupled to the in-pixel amplifier 241 as the target pixel by the switching circuit 243. During the $n^{th}$ row time nth_RT, the $(n-1)^{th}$ selection element STn−1 may be turned on based on the $(n-1)^{th}$ selection control signal SXn−1, and the $n^{th}$ selection element STn may be turned on based on the $n^{th}$ selection control signal SXn.

The $n^{th}$ row time nth_RT may include the $n^{th}$ reset time An, the $n^{th}$ reset readout time Bn, the $n^{th}$ transmission time Cn and the $n^{th}$ data readout time Dn.

During the $n^{th}$ reset time An, the $n^{th}$ pixel PXn may store an offset in the $n^{th}$ floating diffusion node FDn based on the $n^{th}$ reset control signal RXn.

During the $n^{th}$ reset readout time Bn, the $n^{th}$ pixel PXn may generate a pixel signal, which corresponds to a reset level, according to a voltage loaded on the $n^{th}$ floating diffusion node FDn.

During the $n^{th}$ transmission time Cn, the $n^{th}$ pixel PXn may transmit the charges, which are accumulated in the $n^{th}$ photodiode PDn, to the $n^{th}$ floating diffusion node FDn based on the $n^{th}$ transmission control signal TXn. At this time, the disable circuit 245 may disable the in-pixel amplifier 241 based on the disable signal SXB. For example, the disable circuit 245 may electrically decouple the high voltage terminal from the in-pixel amplifier 241 during the $n^{th}$ transmission time Cn. During the $n^{th}$ transmission time Cn, the interruption circuit 249 may electrically decouple the common node CN from the current source 249a based on the interruption control signal SXX, thereby protecting the current source 249a from fluctuation of the common node CN, which occurs as power supplied to the in-pixel amplifier 241, that is, the high voltage, is cut off. The $n^{th}$ pixel PXn may be electrically decoupled from the output terminal VOUT based on the $n^{th}$ selection control signal SXn. Accordingly, during the $n^{th}$ transmission time Cn, a voltage level of the output terminal VOUT may be maintained at the reset level. For example, the voltage level of the output terminal VOUT may hold the reset level by a parasitic capacitor coupled to the output terminal VOUT.

During the $n^{th}$ data readout time Dn, the $n^{th}$ pixel PXn may generate the pixel signal, which corresponds to the target level, that is, a data level of the pixel signal, according to the voltage loaded on the $n^{th}$ floating diffusion node FDn. At this time, the voltage level of the output terminal VOUT from which the pixel signal is outputted may be raised (or amplified) from the reset level to the target level, thereby minimizing the settling time for the pixel signal to reach the target level. In other words, during the $n^{th}$ data readout time Dn, since an operating range or a swing range (refer to the dotted line for VOUT in FIG. 11) of the voltage level of the output terminal VOUT may be reduced to an effective output range (refer to the solid line for VOUT in FIG. 11), the settling time may be minimized.

According to the second embodiment, when a pixel signal is read out, the settling time for the pixel signal to reach a target level may be minimized.

Figure 12:
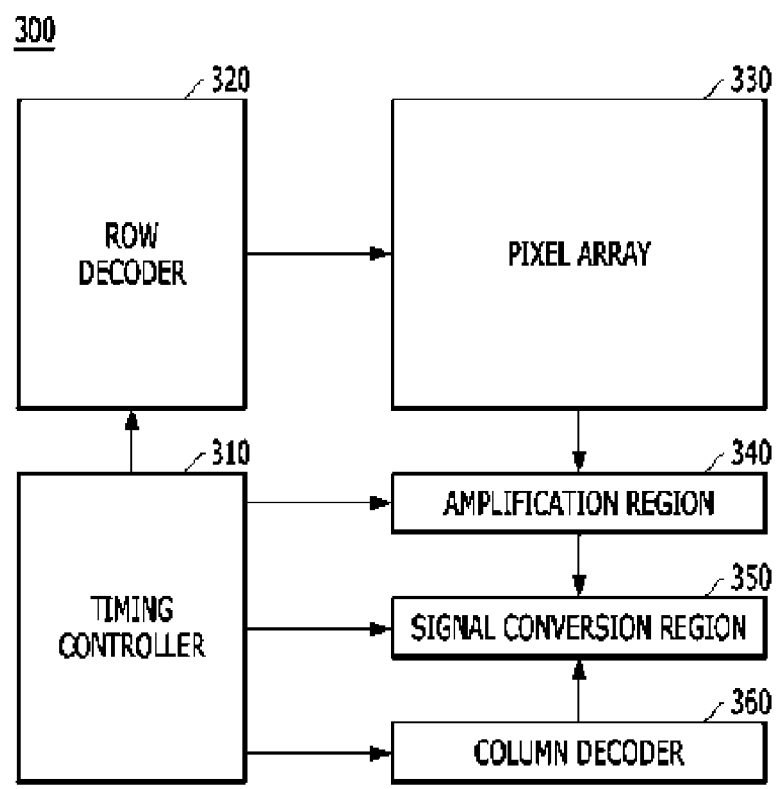
FIG. 12 is a block diagram illustrating an image sensing device in accordance with a third embodiment.

FIG. 12 is a block diagram illustrating an image sensing device 300 in accordance with a third embodiment.

Referring to FIG. 12, the image sensing device 300 may include a timing controller 310, a row decoder 320, a pixel array 330, an amplification region 340, a signal conversion region 350 and a column decoder 360.

The timing controller 310 may control overall operation of the image sensing device 300. The timing controller 310 is also referred to as a timing generator.

The row decoder 320 may control the pixel array 330 for each row. For example, the row decoder 320 may generate first row control signals for controlling pixels arranged in a first row of the pixel array 330, and generate $y^{th}$ row control signals for controlling pixels arranged in a $y^{th}$ row of the pixel array 330. Herein, "y" is a natural number greater than 2.

The pixel array 330 may include pixels arranged at intersections of a plurality of rows and a plurality of columns. The pixels may generate pixel signals for each row under the control of the row decoder 320.

The amplification region 340 may amplify gains of the pixel signals. For example, the amplification region 340 may access a random first pixel of the pixels as a target pixel, access a random second pixel of the pixels as a reference pixel, and amplify a gain of a pixel signal which is read out from the target pixel. The amplification region 340 may include a plurality of in-pixel amplifiers, a plurality of switching circuits and a plurality of pre-chargers, which correspond to the plurality of columns of the pixel array 330 (refer to FIG. 13).

The signal conversion region 350 may convert analog-type pixel signals into digital-type signals. For example, the signal conversion region 350 may include a plurality of analog to digital converters (ADCs) corresponding to the plurality of columns of the pixel array 330.

The column decoder 360 may control the signal conversion region 350 for each column. For example, the column decoder 360 may sequentially control the plurality of ADCs.

Figure 13:
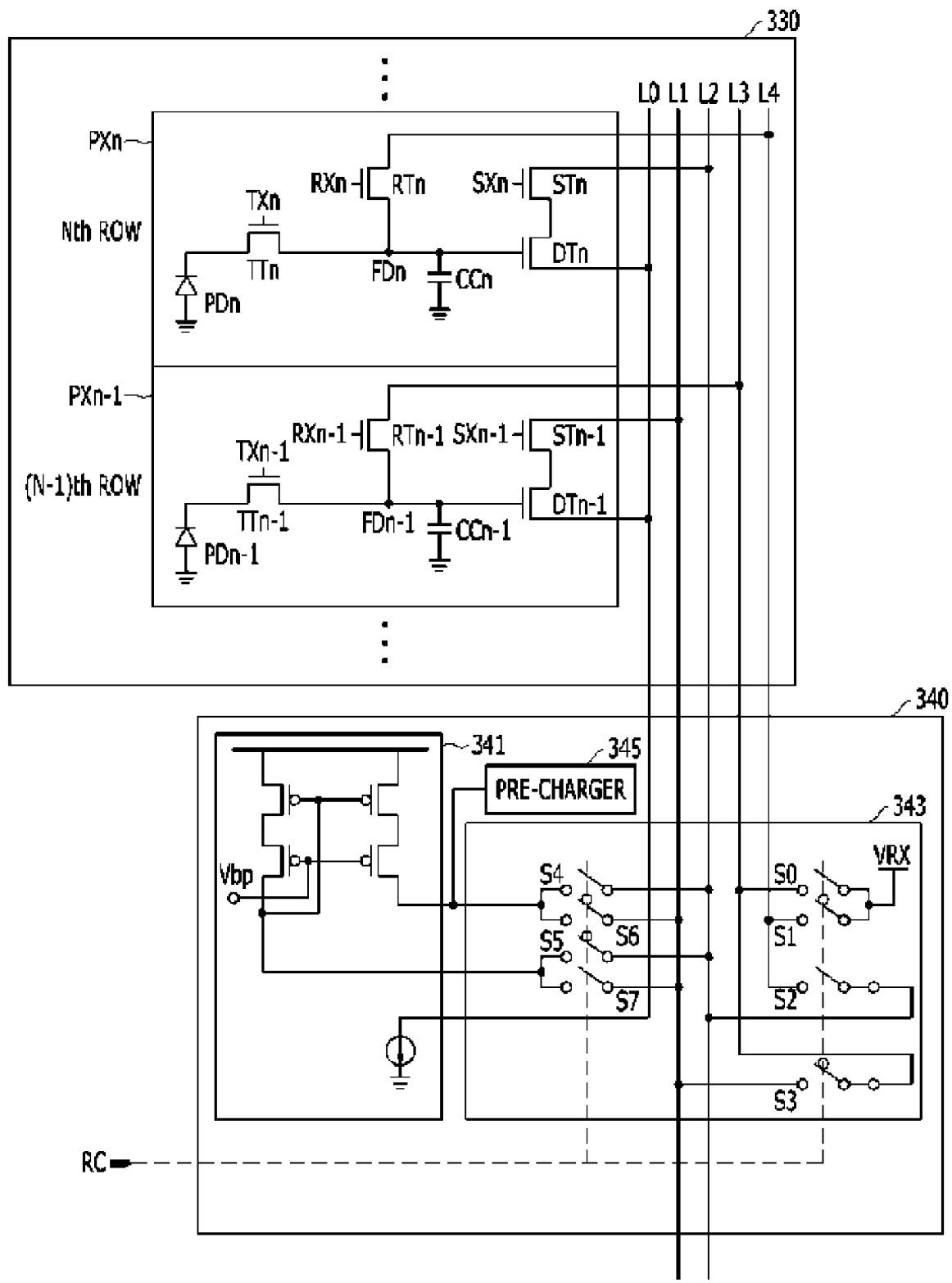
FIG. 13 is a circuit diagram illustrating an example of a pixel array and an amplification region illustrated in FIG. 12.

FIG. 13 is a circuit diagram illustrating an example of the pixel array 330 and the amplification region 340 illustrated in FIG. 12. For convenience in description, a circuit diagram corresponding to a portion of the pixel array 330 and a portion of the amplification region 340 is illustrated in FIG. 13. The portion of the pixel array 330 may include pixels corresponding to any one column of the plurality of columns, and the portion of the amplification region 340 may include an in-pixel amplifier 341 and a switching circuit 343, which correspond to the any one column.

The pixel array 330 may include pixels arranged in a column direction. Hereinafter, a pixel PXn arranged in an $n^{th}$ row among the pixels is referred to as an $n^{th}$ pixel, and a pixel PXn−1 arranged in an $(n-1)^{th}$ row among the pixels is referred to as an $(n-1)^{th}$ pixel. Herein, "n" is a natural number greater than 2. When the $n^{th}$ pixel PXn is the target pixel, the $(n-1)^{th}$ pixel PXn−1 may be the reference pixel. In other words, the target pixel and the reference pixel may be normal pixels arranged adjacent to each other in the column direction.

The $n^{th}$ pixel PXn may include an $n^{th}$ photodiode PDn, an $n^{th}$ transmission element TTn, an $n^{th}$ floating diffusion node FDn, an $n^{th}$ reset transistor element RTn, an $n^{th}$ driving element DTn and an $n^{th}$ selection element STn.

The $n^{th}$ photodiode PDn may be coupled between a low voltage terminal, for example, a ground voltage terminal, and the $n^{th}$ transmission element TTn. For example, the $n^{th}$ photodiode PDn may generate charges, which correspond to incident light, during an $n^{th}$ integration time.

The $n^{th}$ transmission element TTn may be coupled between the $n^{th}$ photodiode PDn and the $n^{th}$ floating diffusion node FDn. The $n^{th}$ transmission element TTn may selectively couple the $n^{th}$ photodiode PDn to the $n^{th}$ floating diffusion node FDn based on an $n^{th}$ transmission control signal TXn. For example, the $n^{th}$ transmission element TTn may transmit the charges of the $n^{th}$ photodiode PDn to the $n^{th}$ floating diffusion node FDn during an $n^{th}$ transmission time Cn of an $n^{th}$ row time nth_RT.

The $n^{th}$ floating diffusion node FDn may be coupled to an $n^{th}$ capacitor CCn. The $n^{th}$ capacitor CCn may store the charges generated by the $n^{th}$ photodiode PDn. For example, the $n^{th}$ capacitor CCn may be a parasitic capacitor.

The $n^{th}$ reset transistor element RTn may be coupled between a fifth line L4 and the $n^{th}$ floating diffusion node FDn. The $n^{th}$ reset transistor element RTn may selectively couple the fifth line L4 to the $n^{th}$ floating diffusion node FDn based on an $n^{th}$ reset control signal RXn. For example, the $n^{th}$ reset transistor element RTn may electrically couple the fifth line L4 to the $n^{th}$ floating diffusion node FDn during an $n^{th}$ reset time An of the $n^{th}$ row time nth_RT.

The $n^{th}$ driving element DTn may be coupled between a first line L0 and the $n^{th}$ selection element STn. The $n^{th}$ driving element DTn may generate an $n^{th}$ pixel signal corresponding to a voltage loaded on the $n^{th}$ floating diffusion node FDn.

The $n^{th}$ selection element STn may be coupled between the $n^{th}$ driving element DTn and a third line L2. The $n^{th}$ selection element STn may output the $n^{th}$ pixel signal to the third line L2 based on an $n^{th}$ selection control signal SXn. For example, the $n^{th}$ selection element STn may output an $n^{th}$ reset signal as the $n^{th}$ pixel signal during an $n^{th}$ reset readout time Bn of the $n^{th}$ row time nth_RT, and output an $n^{th}$ data signal as the $n^{th}$ pixel signal during an $n^{th}$ data readout time Dn of the nth row time nth_RT.

The $n^{th}$ transmission control signal TXn, the $n^{th}$ reset control signal RXn and the $n^{th}$ selection control signal SXn may be $n^{th}$ row control signals generated by the row decoder 320.

The $(n-1)^{th}$ pixel PXn−1 may include an $(n-1)^{th}$ photodiode PDn−1, an $(n-1)^{th}$ transmission element TTn−1, an $(n-1)^{th}$ floating diffusion node FDn−1, an $(n-1)^{th}$ reset transistor element RTn−1, an $(n-1)^{th}$ driving element DTn−1 and an $(n-1)^{th}$ selection element STn−1.

The $(n-1)^{th}$ photodiode PDn−1 may be coupled between the low voltage terminal, for example, the ground voltage terminal, and the $(n-1)^{th}$ transmission element TTn−1. For example, the $(n-1)^{th}$ photodiode PDn−1 may generate charges, which correspond to incident light, during an $(n-1)^{th}$ integration time.

The $(n-1)^{th}$ transmission element TTn−1 may be coupled between the $(n-1)^{th}$ photodiode PDn−1 and the $(n-1)^{th}$ floating diffusion node FDn−1. The $(n-1)^{th}$ transmission element TTn−1 may selectively couple the $(n-1)^{th}$ photodiode PDn−1 to the $(n-1)^{th}$ floating diffusion node FDn−1 based on an $(n-1)^{th}$ transmission control signal TXn−1. For example, the $(n-1)^{th}$ transmission element TTn−1 may transmit the charges of the $(n-1)^{th}$ photodiode PDn−1 to the $(n-1)^{th}$ floating diffusion node FDn−1 during an $(n-1)^{th}$ transmission time of an $(n-1)^{th}$ row time (n−1)th_RT.

The $(n-1)^{th}$ floating diffusion node FDn−1 may be coupled to an $(n-1)^{th}$ capacitor CCn−1. The $(n-1)^{th}$ capacitor CCn−1 may store the charges generated by the $(n-1)^{th}$ photodiode PDn−1. For example, the $(n-1)^{th}$ capacitor CCn−1 may be a parasitic capacitor.

The $(n-1)^{th}$ reset transistor element RTn−1 may be coupled between a fourth line L3 and the $(n-1)^{th}$ floating diffusion node FDn−1. The $(n-1)^{th}$ reset transistor element RTn−1 may selectively couple the fourth line L3 to the $(n-1)^{th}$ floating diffusion node FDn−1 based on an $(n-1)^{th}$ reset control signal RXn−1. For example, the $(n-1)^{th}$ reset transistor element RTn−1 may electrically couple the fourth line L3 to the $(n-1)^{th}$ floating diffusion node FDn−1 during an $(n-1)^{th}$ reset time of the $(n-1)^{th}$ row time (n−1)th_RT. In addition, the $(n-1)^{th}$ reset transistor element RTn−1 may electrically couple the fourth line L3 to the $(n-1)^{th}$ floating diffusion node FDn−1 during the $n^{th}$ reset time An of the $n^{th}$ row time $n^{th}$ RT.

The $(n-1)^{th}$ driving element DTn−1 may be coupled between the first line L0 and the $(n-1)^{th}$ selection element STn−1. The $(n-1)^{th}$ driving element DTn−1 may generate an $(n-1)^{th}$ pixel signal corresponding to a voltage loaded on the $(n-1)^{th}$ floating diffusion node FDn−1.

The $(n-1)^{th}$ selection element STn−1 may be coupled between the $(n-1)^{th}$ driving element DTn−1 and a second line L1. The $(n-1)^{th}$ selection element STn−1 may output the $(n-1)^{th}$ pixel signal to the second line L1 based on an $(n-1)^{th}$ selection control signal SXn−1. For example, the $(n-1)^{th}$ selection element STn−1 may output an $(n-1)^{th}$ reset signal as the $(n-1)^{th}$ pixel signal during an $(n-1)^{th}$ reset readout time of the $(n-1)^{th}$ row time (n−1)th_RT, and output an $(n-1)^{th}$ data signal as the $(n-1)^{th}$ pixel signal during an $(n-1)^{th}$ data readout time of the $(n-1)^{th}$ row time (n−1)

th_RT. In addition, the (n−1)$^{th}$ selection element STn−1 may electrically couple the (n−1)$^{th}$ driving element DTn−1 to the second line L1 during the n$^{th}$ row time nth_RT.

The (n−1)$^{th}$ transmission control signal TXn−1, the (n−1)$^{th}$ reset control signal RXn−1 and the (n−1)$^{th}$ selection control signal SXn−1 may be (n−1)$^{th}$ row control signals generated by the row decoder 320.

The amplification region 340 may include the in-pixel amplifier 341, the switching circuit 343 and a pre-charger 345.

The in-pixel amplifier 341 may sequentially output the (n−1)$^{th}$ pixel signal and the n$^{th}$ pixel signal through an output terminal VOUT. For example, the in-pixel amplifier 341 may amplify a gain of the (n−1)$^{th}$ pixel signal during the (n−1)$^{th}$ row time (n−1)th_RT, and amplify a gain of the n$^{th}$ pixel signal during the n$^{th}$ row time nth_RT. Since the in-pixel amplifier 341 corresponds to a reference-shared in-pixel differential common source amplifier (RSDA) disclosed in the paper "A 0.50 erms Noise 1.45 μm-Pitch CMOS Image Sensor with Reference-Shared In-Pixel Differential Amplifier at 8.3 Mpixel 35 fps," a detailed description thereof is omitted.

The switching circuit 343 may include first to eighth switches S0 to S7. The first to eighth switches S0 to S7 may be controlled based on a row change signal RC. The row change signal RC may be generated by the timing controller 310. Since the first to eighth switches S0 to S7 correspond to switches illustrated in FIG. 5.8.2 of the paper "A 0.50 erms Noise 1.45 μm-Pitch CMOS Image Sensor with Reference-Shared In-Pixel Differential Amplifier at 8.3 Mpixel 35 fps," detailed descriptions thereof are omitted. However, the switching circuit 343 is illustrated according to an RSDA mode disclosed in the paper.

The pre-charger 345 may be coupled to the output terminal VOUT of the in-pixel amplifier 341. The pre-charger 345 is described in more detail below.

Figure 14:
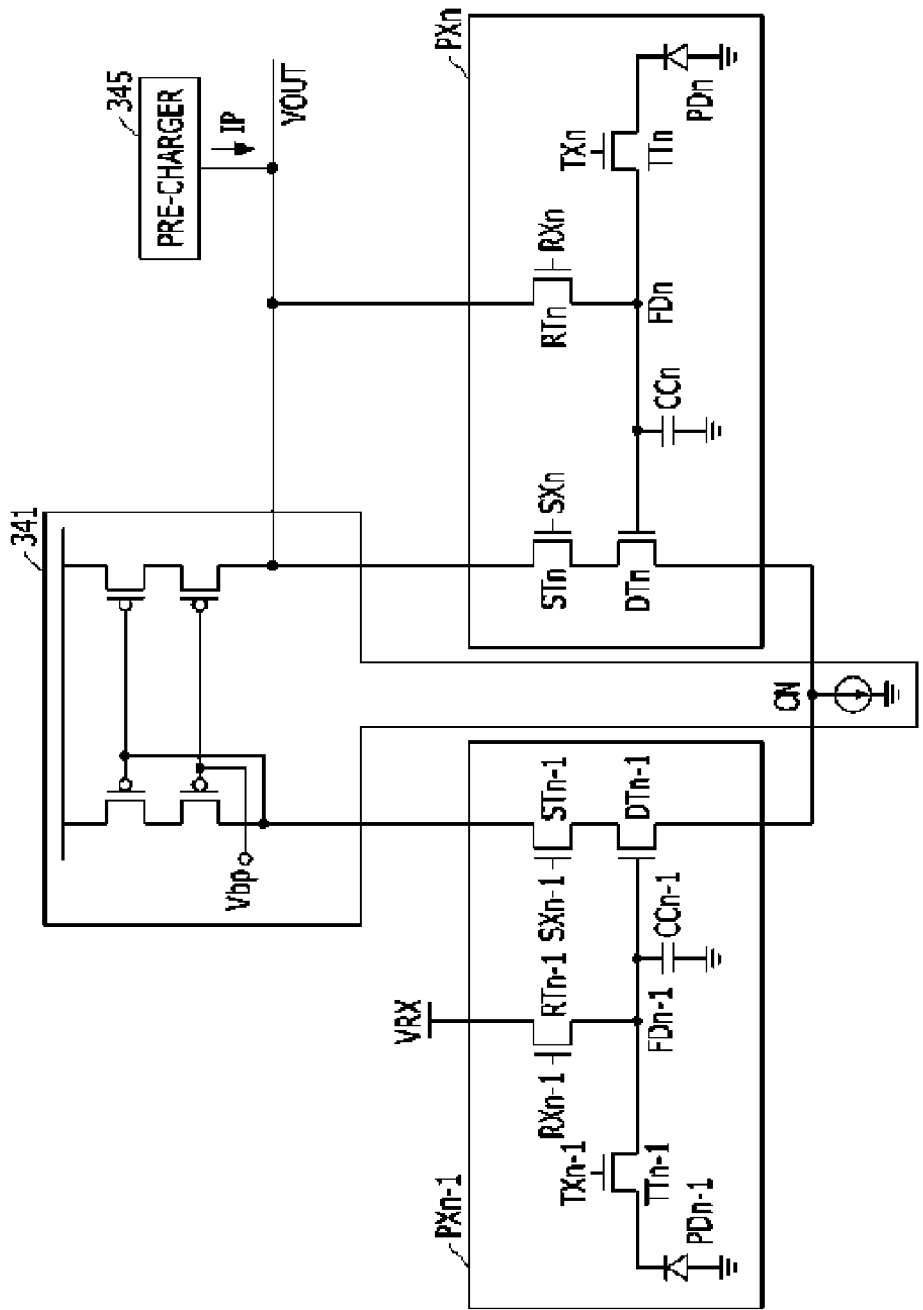
FIG. 14 is an equivalent circuit diagram illustrating an $(n-1)^{th}$ pixel, an $n^{th}$ pixel, an in-pixel amplifier and a pre-charger illustrated in FIG. 13.

FIG. 14 is an equivalent circuit diagram illustrating the (n−1)$^{th}$ pixel PXn−1, the n$^{th}$ pixel PXn, the in-pixel amplifier 341 and the pre-charger 345 illustrated in FIG. 13. FIG. 14 illustrates a case where the n$^{th}$ pixel PXn is coupled to the output terminal VOUT of the in-pixel amplifier 341.

Referring to FIG. 14, the in-pixel amplifier 341 may output a pixel signal of the n$^{th}$ pixel PXn through the output terminal VOUT by using the (n−1)$^{th}$ pixel PXn−1.

The pre-charger 345 may supply a pre-charge current IP to the output terminal VOUT according to a voltage level of the pixel signal of the n$^{th}$ pixel PXn read out through the output terminal VOUT. For example, the pre-charger 345 may supply the pre-charge current IP, which is adaptively adjusted according to a slope of the pixel signal, that is, an amount of change in the voltage level of the pixel signal, to the output terminal VOUT during an initial time of the n$^{th}$ data readout time Dn with a steeper slope being compensated with a greater precharge current.

Figure 15:
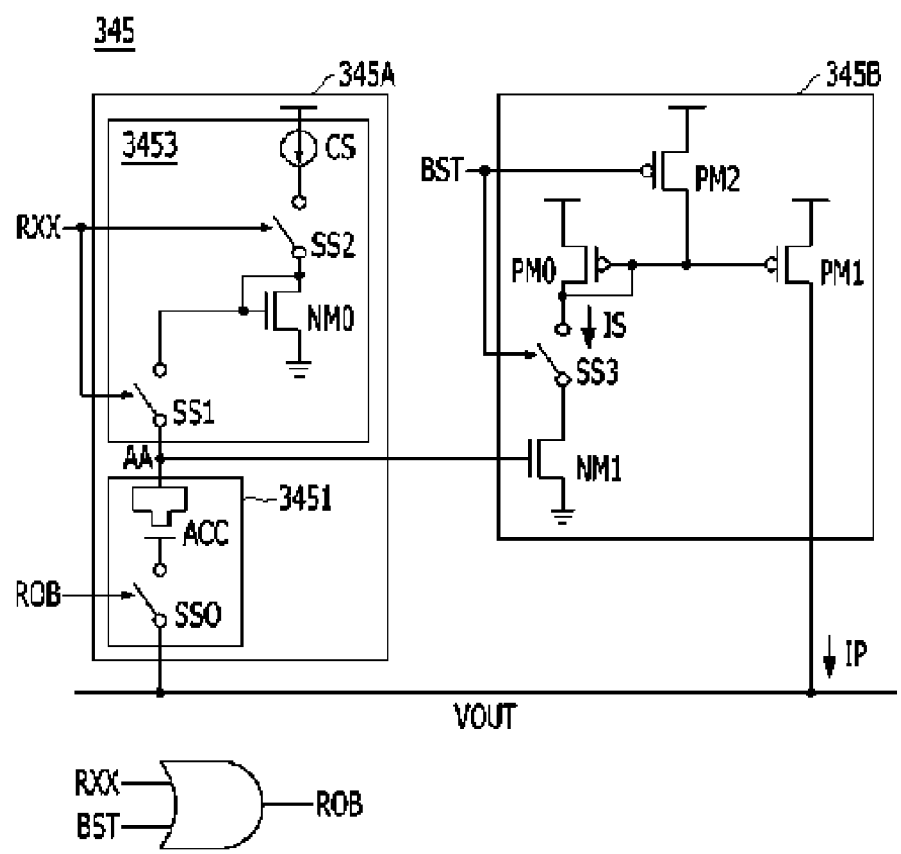
FIG. 15 is a circuit diagram illustrating an example of the pre-charger illustrated in FIGS. 13 and 14.

FIG. 15 is a circuit diagram illustrating an example of the pre-charger 345 illustrated in FIGS. 13 and 14.

Referring to FIG. 15, the pre-charger 345 may include a control circuit 345A and a current supplying circuit 345B.

The control circuit 345A may be coupled between the output terminal VOUT and a high voltage terminal. The control circuit 345A may generate a control voltage corresponding to the voltage level of the pixel signal of the n$^{th}$ pixel PXn. For example, the control circuit 345A may include a sensing circuit 3451 and a reference circuit 3453.

The sensing circuit 3451 may be coupled between the output terminal VOUT and a control node AA. The sensing circuit 3451 may sense the slope of the pixel signal of the n$^{th}$ pixel PXn based on a control signal ROB, and provide the control node AA with the control voltage according to the sensing result. For example, the sensing circuit 3451 may include a first switch SS0 and an AC coupler ACC. The first switch SS0 may be coupled to the output terminal VOUT and a first node. The first switch SS0 may operate based on the control signal ROB. For example, the first switch SS0 may be shorted during the n$^{th}$ reset time An and the initial time. The control signal ROB may be a signal obtained by performing an OR operation on a reference control signal RXX and a boost control signal BST. The reference control signal RXX and the boost control signal BST may be generated by the timing controller 310. The AC coupler ACC may be coupled between the first node and the control node AA. The AC coupler ACC may generate the control voltage whose voltage level is changed corresponding to the slope of the pixel signal of the n$^{th}$ pixel PXn, through the control node AA.

The reference circuit 3453 may provide the control node AA with a reference voltage based on the reference control signal RXX. That is, the reference circuit 3453 may initialize the control node AA to the reference voltage during the n$^{th}$ reset time An. For example, the reference circuit 3453 may include a second switch SS1, a current-voltage converter NM0, a third switch SS2 and a current source CS. The second switch SS1 may be coupled between the control node AA and a second node. The second switch SS1 may operate based on the reference control signal RXX. For example, the second switch SS1 may be shorted during the n$^{th}$ reset time An. The current-voltage converter NM0 may be coupled between the second node and a third node. The current-voltage converter NM0 may convert a reference current generated by the current source CS into the reference voltage. The third switch SS2 may be coupled between the third node and a fourth node. The third switch SS2 may operate based on the reference control signal RXX. For example, the third switch SS2 may be shorted during the n$^{th}$ reset time An. The current source CS may be coupled between the fourth node and the high voltage terminal. The current source CS may generate the reference current.

The current supplying circuit 345B may be coupled between the output terminal VOUT and the high voltage terminal. The current supplying circuit 345B may supply the pre-charge current IP, which is adaptively adjusted according to the voltage level of the pixel signal of the n$^{th}$ pixel PXn (e.g., a higher voltage level resulting in more pre-charge current), to the output terminal VOUT based on the control voltage applied through the control node AA. For example, the current supplying circuit 345B may include a first voltage-current converter NM1, a fourth switch SS3, first current mirror PM0 and PM1 and a driver PM2. The first voltage-current converter NM1 may be coupled between the low voltage terminal and a fifth node. The first voltage-current converter NM1 may convert the control voltage into a control current IS. The fourth switch SS3 may be coupled between the fifth node and a sixth node. The fourth switch SS3 may operate based on the boost control signal BST. For example, the fourth switch SS3 may be shorted during the initial time of the n$^{th}$ data readout time Dn. The first current mirror PM0 and PM1 may be coupled between the sixth node, the output terminal VOUT and the high voltage terminal. The first current mirror PM0 and PM1 may generate the pre-charge current IP corresponding to the control current IS. The driver PM2 may be coupled between the high voltage terminal and a common gate node of the first current mirror PM0 and PM1. The driver PM2 may be controlled based on the boost control signal BST. For example, the driver PM2 may disable the first current mirror PM0 and PM1 during the other times of the $n^{th}$ row time nth_RT except for the initialization time of the $n^{th}$ data readout time Dn.

Figure 16:
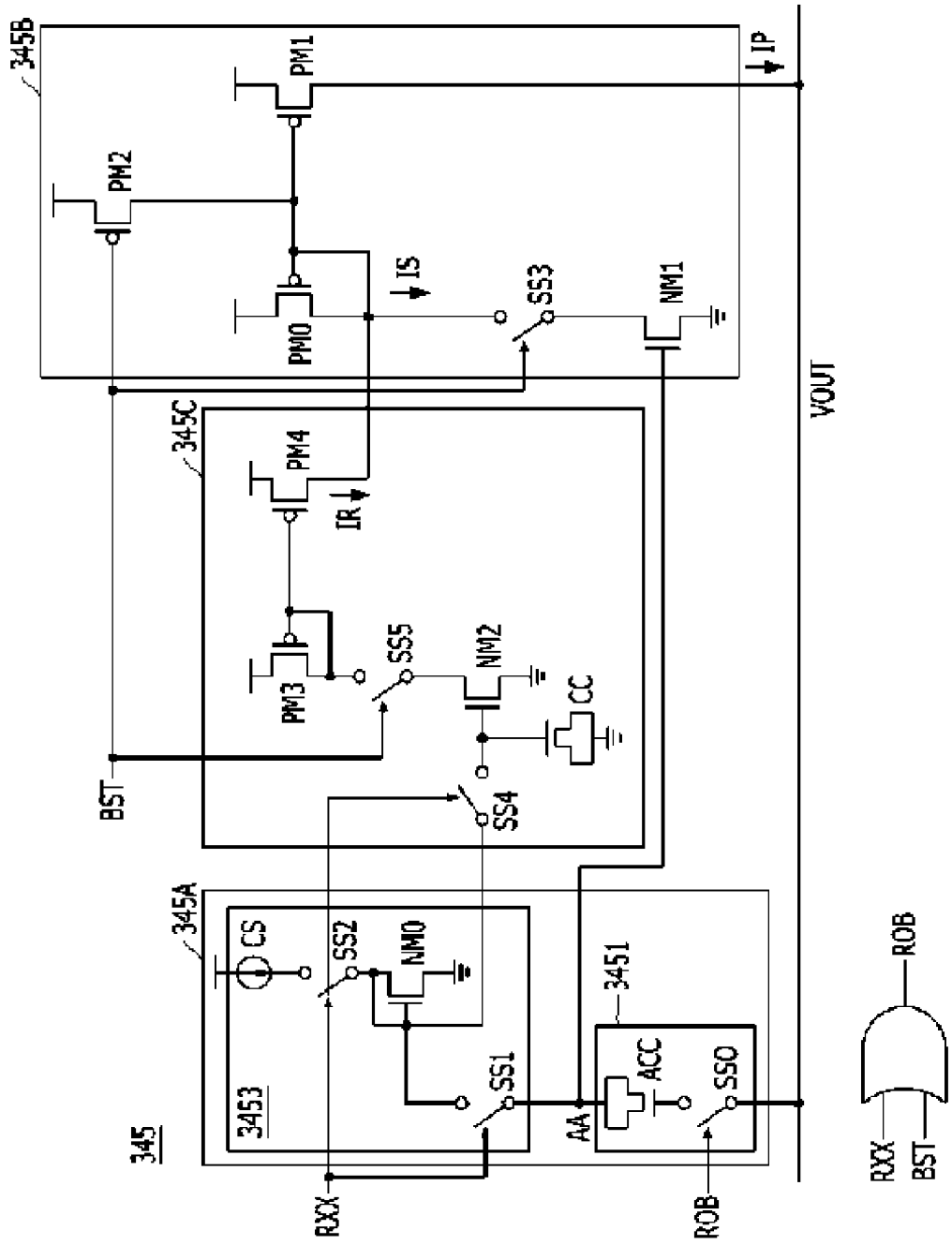
FIG. 16 is a circuit diagram illustrating another example of the pre-charger illustrated in FIGS. 13 and 14.

FIG. 16 is a circuit diagram illustrating another example of the pre-charger 345 illustrated in FIGS. 13 and 14.

Referring to FIG. 16, the pre-charger 345 may include a control circuit 345A, a current supplying circuit 345B and a subtraction circuit 345C.

Since the control circuit 345A and the current supplying circuit 345B are the same as those described in FIG. 15, detailed descriptions thereof are omitted. In FIG. 16, a subtraction current IR may be applied to the pre-charge current IP generated by the current supplying circuit 345B. That is, the pre-charge current IP may correspond to a current obtained by subtracting the subtraction current IR from the control current IS (IP=IS−IR).

The subtraction circuit 345C may be coupled between the high voltage terminal and the low voltage terminal. The subtraction circuit 345C may be coupled between the second node of the reference circuit 3453 and the sixth node of the current supplying circuit 345B. The subtraction circuit 345C may receive the reference voltage through the second node, and generate the subtraction current IR, which corresponds to the reference voltage or the reference current, through the sixth node. For example, the subtraction circuit 345C may include a fifth switch SS4, a capacitor CC, a second voltage-current converter NM2, a sixth switch SS5 and a second current mirror PM3 and PM4.

The fifth switch SS4 may be coupled between the second node and a seventh node. The fifth switch SS4 may operate based on the reference control signal RXX. For example, the fifth switch SS4 may be shorted during the $n^{th}$ reset time An.

The capacitor CC may be coupled between the seventh node and the low voltage terminal. The capacitor CC may store the reference voltage.

The second voltage-current converter NM2 may be coupled between the seventh node, the low voltage terminal and an eighth node. The second voltage-current converter NM2 may generate a storage current, which corresponds to the reference voltage stored in the capacitor CC, through the eighth node.

The sixth switch SS5 may be coupled between the eighth node and a ninth node. The sixth switch SS5 may operate based on the boost control signal BST. For example, the sixth switch SS5 may be shorted during the initial time of the $n^{th}$ data readout time Dn.

The second current mirror PM3 and PM4 may be coupled between the ninth node, the high voltage terminal and the sixth node of the current supplying circuit 345B. The second current mirror PM3 and PM4 may generate the subtraction current IR, which corresponds to the storage current, through the sixth node.

Hereinafter, an operation of the image sensing device 300 in accordance with the third embodiment, which has the above-described configuration, is described with reference to FIGS. 17 and 18.

Figure 17:
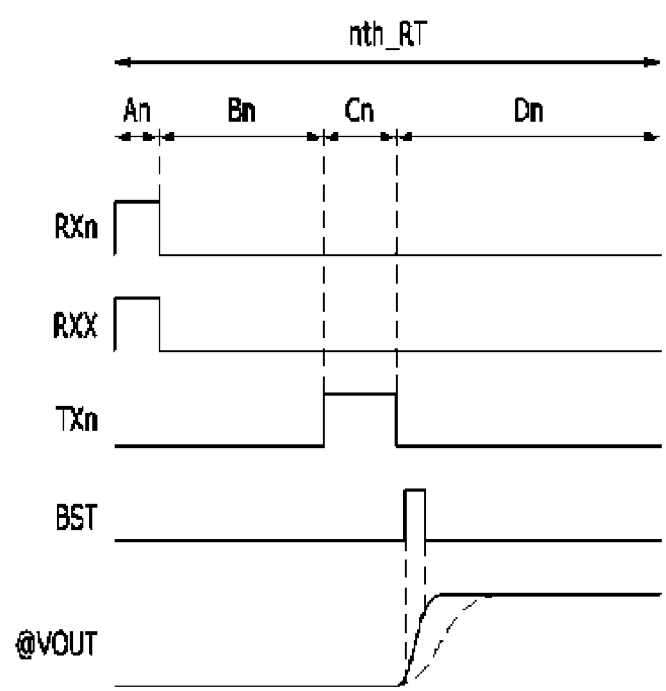
FIG. 17 is a timing diagram illustrating an operation of the image sensing device illustrated in FIG. 12.

FIG. 17 is a timing diagram illustrating an operation of the image sensing device illustrated in FIG. 12. A case in which the $n^{th}$ pixel PXn is the target pixel is representatively described.

Referring to FIG. 17, during the $n^{th}$ row time nth_RT, the $(n-1)^{th}$ pixel PXn−1 may be coupled to the in-pixel amplifier 341 as the reference pixel by the switching circuit 343, and the $n^{th}$ pixel PXn may be coupled to the in-pixel amplifier 341 as the target pixel by the switching circuit 343. During the $n^{th}$ row time nth_RT, the $(n-1)^{th}$ selection element STn−1 may be turned on based on the $(n-1)^{th}$ selection control signal SXn−1, and the $n^{th}$ selection element STn may be turned on based on the $n^{th}$ selection control signal SXn.

During the $n^{th}$ reset time An of the $n^{th}$ row time nth_RT, the $(n-1)^{th}$ reset transistor element RTn−1 may be turned on based on the $(n-1)^{th}$ reset control signal RXn−1, and the $n^{th}$ reset transistor element RTn may be turned on based on the $n^{th}$ reset control signal RXn. Accordingly, a negative feedback loop may be formed between the $n^{th}$ floating diffusion node FDn and the output terminal VOUT, and an offset may be stored in the $n^{th}$ floating diffusion node FDn. The offset may refer to a mismatch between the $(n-1)^{th}$ pixel PXn−1 and the $n^{th}$ pixel PXn. For reference, the offset may be canceled out through a correlated double sampling (CDS) operation.

At the same time, during the $n^{th}$ reset time An, the first switch SS0 included in the sensing circuit 3451 and the second and third switches SS1 and SS2 included in the reference circuit 3453 may be shorted by the reference control signal RXX. Accordingly, the control voltage of the control node AA may be initialized to a voltage level corresponding to the reference voltage generated by the reference circuit 3453.

During the $n^{th}$ reset readout time Bn, the in-pixel amplifier 341 may output a reset signal corresponding to the offset as the pixel signal of the $n^{th}$ pixel PXn.

During the $n^{th}$ transmission time Cn, the $n^{th}$ pixel PXn may transmit the charges accumulated in the $n^{th}$ photodiode PDn to the $n^{th}$ floating diffusion node FDn based on the $n^{th}$ transmission control signal TXn.

During the $n^{th}$ data readout time Dn, the in-pixel amplifier 341 may output a data signal corresponding to the charges as the pixel signal of the $n^{th}$ pixel PXn. At this time, during the initial time of the $n^{th}$ data readout time Dn, the pre-charger 345 may supply the pre-charge current IP, which is adaptively adjusted according to the voltage level of the pixel signal of the $n^{th}$ pixel PXn (e.g., a higher voltage level resulting in more pre-charge current), to the output terminal VOUT. Accordingly, the settling time of the pixel signal of the $n^{th}$ pixel PXn outputted through the output terminal VOUT may be reduced, and thus the readout time of the pixel signal may be shortened.

When the subtraction circuit 345C is included in the pre-charger 345, the subtraction current IR may be applied to the pre-charge current IP. That is, the pre-charger 345 may generate the current, obtained by subtracting the subtraction current IR from the control current IS, as the pre-charge current IP (IP=IS−IR). Accordingly, when the pixel signal of the $n^{th}$ pixel PXn is outputted through the output terminal VOUT, overshoot occurring in the pixel signal may be prevented. As the pixel signal has a lower voltage level, the pixel signal is more affected by the reference voltage of the reference circuit 3453 by the pre-charge current IP. Accordingly, as the pixel signal has a lower voltage level, the overshoot having a larger level may occur in the pixel signal by the pre-charge current IP, but the pre-charge current IP may be generated by subtracting the subtraction current IR corresponding to the reference voltage from the control current IS, thereby preventing the overshoot.

Figure 18:
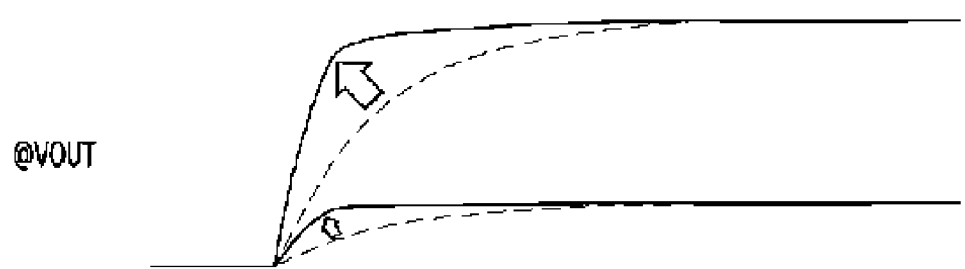
FIG. 18 is a timing diagram additionally illustrating the operation of the image sensing device illustrated in FIG. 17.

FIG. 18 is a timing diagram additionally illustrating the operation of the image sensing device 300 illustrated in FIG. 17.

Referring to FIG. 18, as described above, the pre-charger 345 may generate the pre-charge current IP that is adaptively adjusted according to the voltage level of the pixel signal of the $n^{th}$ pixel PXn. For example, the pre-charger 345 may generate the pre-charge current IP having a lower level as the slope of the pixel signal is small, that is, as the amount of change in the voltage level of the pixel signal decreases, and generate the pre-charge current IP having a higher level as the slope of the pixel signal is steep, that is, as the amount of change in the voltage level of the pixel signal increases.

According to the third embodiment, there is an advantage of adaptively boosting a readout line, i.e., an output terminal, of a pixel signal according to a voltage level of the pixel signal.

According to embodiments of the present disclosure, a load of a readout line of a pixel signal may be reduced in a structure where an in-pixel amplifier is coupled to the readout line, and thus a readout speed of the pixel signal may be improved.

In addition, according to embodiments of the present disclosure, the settling time of a pixel signal outputted through a readout line of the pixel signal may be minimized in a structure where an in-pixel amplifier is coupled to the readout line, and thus a readout speed of the pixel signal may be improved.

While the present disclosure has been illustrated and described with respect to specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure.

Further, the methods, processes, and/or operations described herein may be performed by code or instructions to be executed by a computer, processor, controller, or other signal processing device such as control device 345A (described above). The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features such as control device 345A (described above) may include, for example, a memory or other storage device for storing code or instructions to be executed, for example, by a computer, processor, microprocessor, controller, or other signal processing device.

What is claimed is:

1. An image sensing device comprising:
   a reference pixel;
   a target pixel electrically decoupled from an output terminal of a target pixel signal during a transmission time in which charges accumulated in a photodiode are transmitted to a floating diffusion node, and configured to output the target pixel signal through the output terminal during a readout time after the transmission time;
   an amplifier coupled to the reference pixel and the target pixel, and configured to amplify the target pixel signal during the readout time;
   a disable circuit configured to disable the amplifier during the transmission time; and
   a compensation circuit configured to supply a compensation current to a common node to which a current source included in the amplifier is coupled, during the transmission time.

2. The image sensing device of claim 1, wherein the disable circuit is coupled between a high voltage terminal and the amplifier, and is configured to electrically decouple the high voltage terminal from the amplifier during the transmission time.

3. The image sensing device of claim 1, wherein the compensation circuit includes:
   a first switch coupled between a high voltage terminal and a coupling node, and configured to operate based on a first control signal having a fixed voltage level; and
   a second switch coupled between the coupling node and the common node, and configured to operate based on a second control signal that is activated during the transmission time.

4. The image sensing device of claim 1, wherein the reference pixel includes a pixel disposed in a row adjacent to a row where the target pixel is disposed.

5. The image sensing device of claim 1, further comprising a switching circuit configured to couple the reference pixel to the amplifier and couple the target pixel to the amplifier, during a row time.

6. An image sensing device comprising:
   a reference pixel;
   a target pixel electrically decoupled from an output terminal of a target pixel signal during a transmission time in which charges accumulated in a photodiode are transmitted to a floating diffusion node, and configured to output the target pixel signal through the output terminal during a readout time after the transmission time;
   an amplifier coupled to the reference pixel and the target pixel, and configured to amplify the target pixel signal during the readout time;
   a disable circuit configured to disable the amplifier during the transmission time; and
   an interruption circuit configured to electrically decouple a common node from a current source included in the amplifier, during the transmission time.

7. The image sensing device of claim 6, wherein the disable circuit is coupled between a high voltage terminal and the amplifier, and is configured to electrically decouple the high voltage terminal from the amplifier during the transmission time.

8. The image sensing device of claim 6, wherein the reference pixel includes a pixel disposed in a row adjacent to a row where the target pixel is disposed.

9. The image sensing device of claim 6, further comprising a switching circuit configured to couple the reference pixel to the amplifier and couple the target pixel to the amplifier, during a row time.

* * * * *